March 24, 1970 G. VON VOROS 3,502,882

OPTO-GRAPHICAL MEMORY AND DIGITALIZED CONTROL
SYSTEM FOR PRECISION MACHINING

Filed Jan. 17, 1968 11 Sheets-Sheet 1

INVENTOR.
GEZA VONVOROS
BY
Ralph R Roberts
AGENT.

INVENTOR.
GEZA VON VOROS
BY Ralph R Roberts
AGENT

March 24, 1970 G. VON VOROS 3,502,882

OPTO-GRAPHICAL MEMORY AND DIGITALIZED CONTROL SYSTEM FOR PRECISION MACHINING

Filed Jan. 17, 1968 11 Sheets-Sheet 3

INVENTOR.
GEZA VON VOROS

BY Ralph R Roberts

AGENT.

INVENTOR.
GEZA VON VOROS
BY
Ralph R. Roberts
AGENT.

INVENTOR.
GEZA VON VOROS
BY
Ralph R. Roberts
AGENT.

INVENTOR.
GEZA VON VOROS
BY
Ralph R. Roberts
AGENT.

INVENTOR.
GEZA VON VOROS
BY
Ralph R Roberts
AGENT.

INVENTOR.
GEZA VON VOROS
BY Ralph R Roberts
AGENT

INVENTOR.
GEZA VON VOROS
BY
Ralph R. Roberts
AGENT.

INVENTOR.
GEZA VON VOROS
BY
Ralph R Roberts
AGENT.

INVENTOR.
GEZA VON VOROS
BY
Ralph R. Roberts
AGENT.

1

3,502,882
OPTO-GRAPHICAL MEMORY AND DIGITALIZED CONTROL SYSTEM FOR PRECISION MACHINING

Geza von Voros, 123 Radburn Road,
Glen Rock, N.J. 07452

Filed Jan. 17, 1968, Ser. No. 698,648
Int. Cl. G05k *1/00*
U.S. Cl. 250—202 29 Claims

ABSTRACT OF THE DISCLOSURE

An opto-graphical memory and digitalized control system to guide a precision machining operation and/or produce a drawing in which any of one, two or three dimensional curves are converted stepwise into a corresponding linear or rectilinear equivalent. The curve or line of a drawing or master print is illuminated to obtain a brightness difference between the curve being followed and the adjacent area. An optical reading head having a plurality of optical fibers each having a miniature photosensitor attached thereto is adapted to receive an image of a portion of the line being read upon an optical decoding matrix disposed in the focal plane of the optical head. The head is driven by stepping actuators for each coordinate axis relative to the line being read. The electrical output from each photosensitor is fed to a logic system which determines subsequent commands. As the optical head is moved so also is a secondary positioning means moved in a precise relationship to the head. The secondary positioning means may be either a writing or printing mechanism or a machine tool. The geometry of the information being read or produced may be one, two or three dimensional with the machine tool when so operated producing a part in accordance to that information.

BACKGROUND OF THE INVENTION

Field of the invention

The field of art to which this invention pertains is found in the class of Registers and more particularly in the subclass of "calculators, electrical with external device," and with "manufacturing process control," and "machine tool." Also pertinent is the class of Radiant Energy and particularly the subclass of "ray energy, photocells, following a pattern"; also the subclass with "web, strand or record in optical path"; also the subclass "plural light sources, optical paths or photosensitive elements"; and the subclass "means for moving optical system."

The field of art also may include the class of Communications, Electrical and the subclasses of "error checking systems"; "digital comparator systems"; and with "systems with more than two indications."

DESCRIPTION OF THE PRIOR ART

In the field of automatic machine tool control, several guiding devices have been invented in the past. These devices may be divided into three categories.

(1) Mechanical tracking devices wherein templates and apparatus with simple cam follower principle are used to guide the machine tool either directly or through electromechanical or electro-hydraulic actuators.

(2) Electro-optical line tracers whereby the curve or line to be traced is optically detected and the output of photosensitors is used with a closed-loop servo system to position the machine tool. Patents representative of these line tracing devices are shown in U.S. Patents No. 3,214,661, to Duff of Oct. 26, 1965; No. 3,015,730, to Johnson of Jan. 2, 1962; No. 3,286,142 to Redman of Nov. 15, 1966; No. 2,988,643 to Inaba of June 13, 1961; and No. 2,989,639 to Dulebohn of June 20, 1961.

2

The few representative devices mentioned above, as well as others, are inherently sensitive to instabilities due to the closed-loop servo control whereby mechanical vibration of the controlled machine or sensing means will feed back its oscillatory motion to the error sensing means. In order to avoid the undesired self excitation, the sensitivity of the system must be decreased which will, however, increase the tracing error.

In order to insure a constant net speed of the guided cutting tool when tracing a plane curve, a sine-cosine drive or integrators must be used with the forementioned tracers which require the rotation of the optical sensor thus introducing additional sources of error. Furthermore, the above mentioned devices are not capable of following sudden turns in the curve to be traced without overshoot or overtravel whose amplitude will increase with tool speed and may result in instabilities and oscillation of the system. Some of the optical sensors described in the aforementioned patents are utilizing light choppers or oscillating photocells or vibrating mirrors. These are imposing limitations on the speed of the system as well as, in many cases, requiring the line thickness of the curve to be followed to be within close tolerances thereby introducing additional sources of possible errors. In these systems a most serious problem is the dependence in accuracy upon the drawings or templates to be used and it is well known that handmade drawings have definite limitations in their accuracy.

(3) Tape, magnetic drum or punch card controlled machines. These devices have the advantage of providing accurate positioning without feed-back. The disadvantage of these machines is the relatively high price; the frightening complexity of the system for the layman; the time consuming and expensive programing procedure required; the necessarily large storage volume, and the difficulty of identification of the relations between the stored data of a point in the coordinate system and the location of that point on the workpiece. Furthermore, for multipass operation the machining operation must be stopped and the tape or punch card must be rewound.

The present invention eliminates all of the forementioned shortcomings of other devices and provides an inexpensive system for precision automatic machining processes by; being capable of transforming an inaccurate engineering drawing or sketch into a stepwise linear or stepwise rectilinear master print with a precision of one-thousandth of an inch or better; utilizing digital control wherein the open-loop servo is insensitive to mechanical vibration of the controlled machine tool thereby eliminating instabilities; the stored data is in the form of a drawing enabling the identification of the workpiece to be fabricated as well as the corresponding coordinates between the stored data and the workpiece by a simple visual inspection; correction of the master print for any tool diameter is provided automatically, and the sensing system does not contain any moving parts thereby the speed of operation is not limited by the sensing means.

SUMMARY OF THE INVENTION

In the present invention in one embodiment an optical head, movable in an *x* and *y* direction, is adapted to "read" either the inside or outside of a line and to follow this line with a non-cumulative error which is of a determined maximum such as one-thousandth of an inch. As this line is followed, signals from the optical head are simultaneously fed to a slave positioner at a machine tool so that the positioner moves in synchronism with the "reading" optical head.

In another embodiment an optical head is disposed above a programmer having an illuminated table and a precision straight edge movable thereover. Precision circle-segments with varying radii are also contemplated as being provided on the table as well as a place for other selected shapes. By manipulation of this programmer, sections of an engineering drawing or sketch are reproduced with high accuracy through the stepwise operation of the optical head which is caused to trace the displayed geometry. The "reading" optical head produces signals which are fed to a writing mechanism adapted to draw a master print on Mylar and the like. The drawing or master print so produced is of a determined precision such as one-thousandth of an inch. The width of the line is merely a matter of selection and is not critical as only the inner or outer edge of the line is "read" by the optical head.

Where desired, the apparatus may be programmed to read a third dimension in synchronism with the "reading" of the *x–y* coordinates of the drawing. The resulting movement of the machine tool operation is not only a precise *x–y* control but also provides a responsive *z* movement representative of the height or thickness contour.

This invention contemplates the use of an optical head which includes at least four precisely positioned optical fibers each connected to a photosensitor. The outputs of these photosensitors are fed to a digital transistor logic in which the signals of the photosensitors are compared in relation to determined rules. In response to step-commands from the digital transistor logic the optical head is moved along *x–y* coordinates in steps with simultaneous step-commands being fed to a tool positioner. Only one step is made at a time in either the *x* or *y* direction in accordance with signals derived from the optical head "reading" of the master print. The speed of tracking is a selected constant and is contemplated as being a "dialed-in" clock rate.

This invention provides a reading station whereat the machine operator may visually inspect the drawing as the machine tool is making its cut. With the drawing or master print made to a high standard of accuracy the optical head reading thereof provides no accumulation of error. The drawing or program for the optical memory is in the form of a master print generally on a thin Mylar sheet which minimizes storage space as well as time necessary for identification and orientation. To use this system requires no special training or skill of the machine operator other than the skill normally expected to operate a conventional machine.

It is an object of this invention to provide an opto-graphical memory and digitalized control system adapted for the precision machining of a workpiece or for producing a master print and the like. The system is adapted to "read" a curve of one, two or three dimensions and to convert these curves into linear and rectilinear equivalents of the curve. The system includes an optical head for "reading" a source of data, said head including a grouping of at least four optical fibers arranged in a precision square with a photosensitor attached to one end of each optical fiber, said photosensitors being responsive to the reading of the data so as to send a signal to a control system in response to said reading. The optical head is displaced in a stepwise manner relative to the source being "read" with the stepwise displacement corresponding in movements to at least one of the one, two or three coordinate directions of the data or information being "read." A logic system is adapted to receive the signals from the optical head and to transcribe these signals into stepping commands to displace the optical head and to provide like stepping commands to a secondary positioning means.

It is a further object of this invention to provide an opto-graphical memory and digitalized control system in which the optical head includes four optical fibers each having a tapered end portion extending from a main body to an image receiving end of greatly reduced diameter, the body end of the optical fiber being optically connected to the photosensitor. An additional photosensitor, not a part of the reading matrix, is carried by the head so as to "read" the general light level of the source of data being "read." The localized data being "read" by the four optical fibers of the head is fed through a lens system so as to magnify the viewed localized data such as a line of a drawing.

It is a still further object of this invention to provide an opto-graphical memory and digitalized control system in which the secondary positioning means includes a writing system adapted to produce a line on a data storing medium such as Mylar film.

It is a still further object of this invention to provide an opto-graphical memory and digitalized control system in which the optical head is fixedly mounted in a housing which is moved in determined steps with the housing and optical fibers therein being brought to a stationary condition during the reading of the data.

INTENT OF THE DISCLOSURE

Although the following disclosure offered for public dissemination is detailed to insure adequacy and aid in understanding of the invention, this is not intended to prejudice that purpose of a patent which is to cover each new inventive concept therein no matter how it may later be disguised by variations in form or additions of further improvements. The claims at the end hereof are intended as the chief aid toward this purpose, as it is these that meet the requirements of pointing out the parts, improvements, and combinations in which the inventive concepts are found.

There has been chosen a specific embodiment showing a general concept of the invention and two modifications of this general concept are shown in which the opto-graphical memory and digitalized control system is adapted to read and produce lines of extreme accuracy. These embodiments have been chosen for the purpose of illustration and description and as shown in the accompanying drawings wherein:

BRIEF DESCRIPTION OF THE DRAWINGS

FIG. 2 represents a simplified isometric and diagrammatic view showing one application or embodiment of the invention in which a reading head of the Opto-Graphical Memory is tracking or "reading" a line of a master print while controlling simultaneously a slave positioner used with a machine tool or the like;

DESCRIPTION OF THE FLOW DIAGRAM OF FIG. 1

Figure 1:
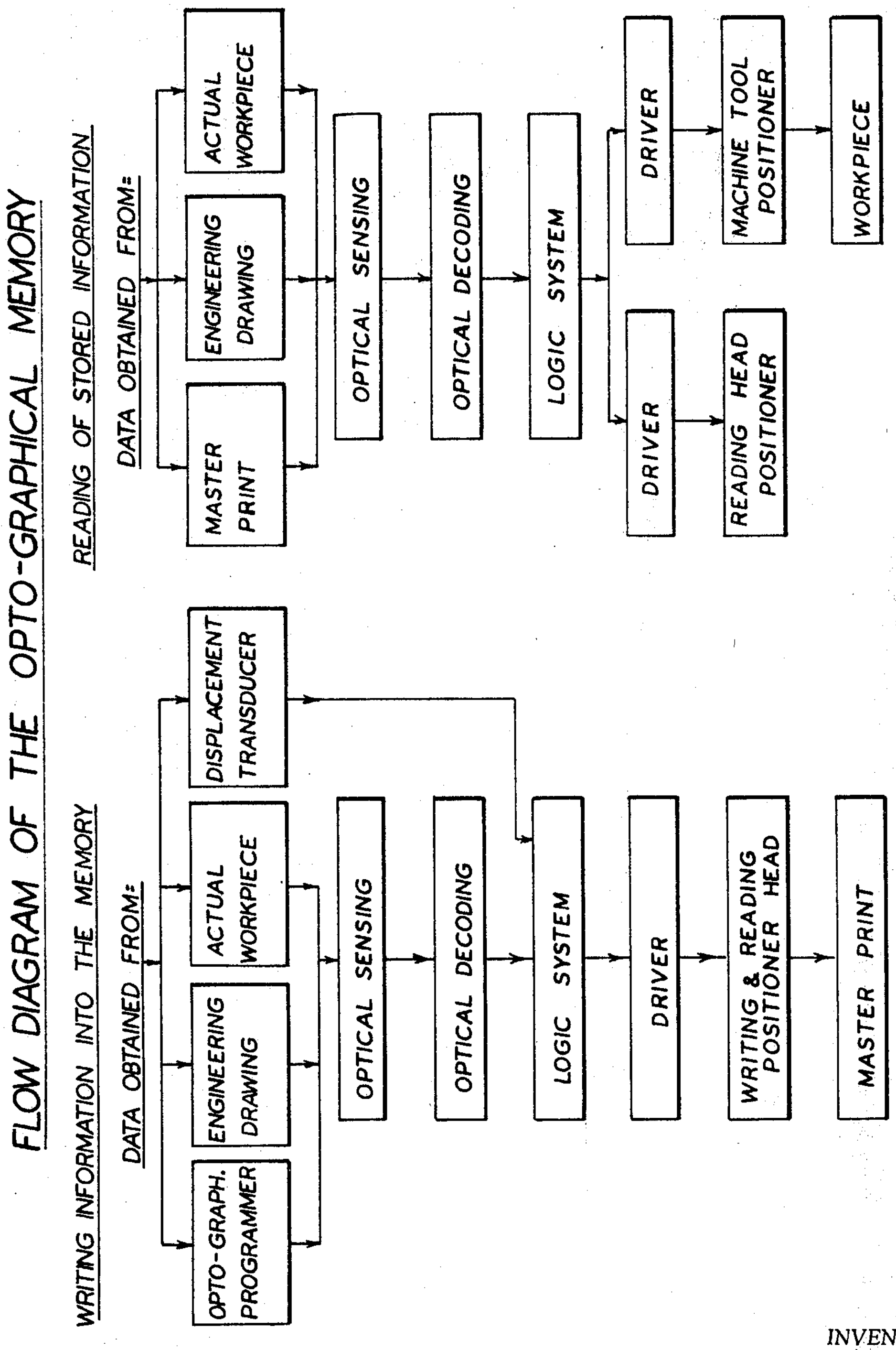
FIG. 1 represents a flow diagram of an Opto-Graphical Memory and Digitalized Control System.

Referring now to the drawings in which like numbers refer to like members throughout the several figures and in particular to FIG. 1 wherein a flow diagram of the Opto-Graphical Memory is presented outlining the various functions of the fundamental components of this invention.

The function of the entire system may be characterized by three basic operations: (a) writing information into an Opto-Graphical Memory; (b) reading the stored information (a master print) and, (c) guiding a slave positioner or machine tool by the read information.

As noted in the flow diagram of FIG. 1, the information (writing information into the memory) about the geometry to be memorized may be obtained from various sources. One source is an Opto-Graphical Programer (with its subsystems) which is an integral part of this invention and is adapted to convert an engineering idea or blueprint into an accurate print (master print) which represents the desired stored information. Similarly, an engineering drawing or sketch, as well as an actual machine part, may be the source of information. Another source of information may be provided by a memorizable geometry which may be tracked by displacement transducers (like a linear or rotary servo-potentiometers or analog to digital converters) whose output will control the writing head of the optical memory.

Reading of the stored information may be from either a master print, an engineering drawing or an actual workpiece and the translation of this information into positioning commands is a function of an optical head and logic system. The output of the logic system is adapted to control the mechanism of both a reading head positioner and/or a machine tool positioner.

DESCRIPTION OF THE OPTO-GRAPHICAL MEMORY OF FIG. 2

Figure 2:
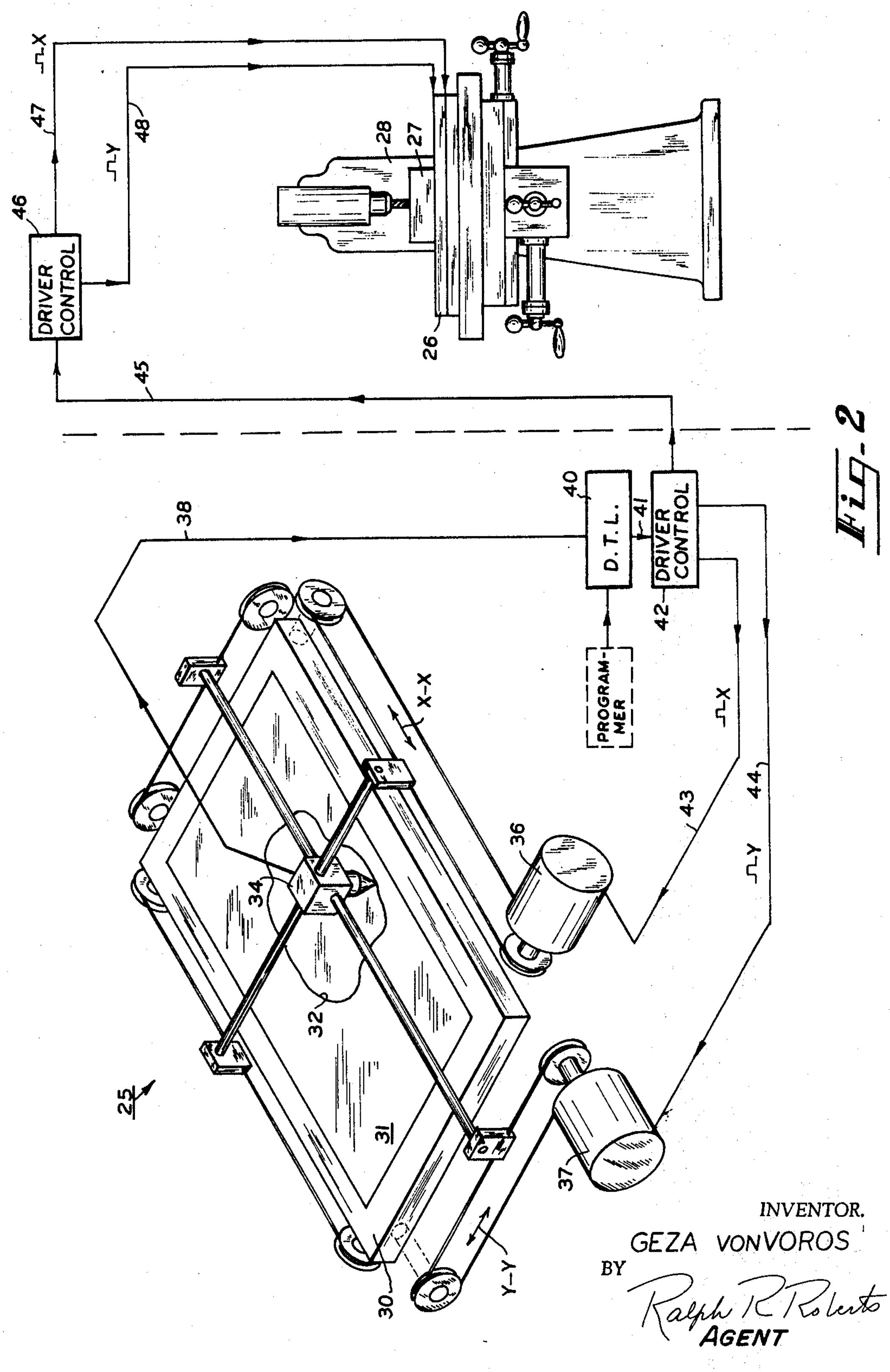

The operational arrangement of the components forming the automatic control system of this invention are symbolically represented in FIG. 2. As depicted, the output of an optical memory 25 includes a read-write head which is connected to a slave positioner 26 which in this embodiment is adapted to move a workpiece 27 under the head of a vertical milling machine 28. It is to be noted that any machine tool such as a drill press, jig-borer, jig-grinder, welding or cutting machine or like apparatus may be used instead of milling machine 28. The positioner 26 may also be used to move a template or drawing plate under an appropriate line-producing means to be more fully described hereinafter.

Referring particularly to the optical memory 25, there is provided an illuminated table 30 utilizing either transmitted or reflected light, carrying thereon a master print 31 having a line drawing 32. The line of the drawing is precisely followed or traced by an optical reading head 34 which head is accurately moved by stepping motors 36 and 37. Motor 36 is operatively connected to reciprocably move head 34 in the direction of the arrows which indicate the X—X coordinate. Motor 37 is operatively connected to reciprocably move head 34 in the direction of the arrows which indicate the Y—Y coordinate. Although the operative connection of the motors 36 and 37 (the means for moving the head 34) is shown (for the sake of simplicity) as pulleys and cables, a pair of precision lead screws, hydraulic displacement systems or like conventional longitudinal precision moving means may be used. The responsive precision moving of the head 34 is merely a matter of selection of proper actuators and no patentable significance is made thereto. It is also contemplated that head 34 may be fixed and the table 30 be precisely moved in the X and Y directions.

From the optical reading head 34 a signal is fed through conductor 38 to a digital transistor logic system 40 (hereinafter referred to as DTL) which analyzes the signal and in response thereto feeds a determined electric pulse through conductor 41 to a driver stepping control 42. From control 42 a plus-minus $x$ or plus-minus $y$ pulse signal is sent or fed through conductors 43 and 44 to motors 36 and 37 respectively. The same pulse signal is also fed through conductor 45 to slave positioner driver 46. From driver 46 a pulse signal is fed through conductors 47 and 48 to $x$ and $y$ stepping motors (not shown), or the like, on positioner 26. Positioner 26 is thus moved in the X and Y directions a precise distance proportional to the X and Y movements of the optical reading head 34.

Figure 3:
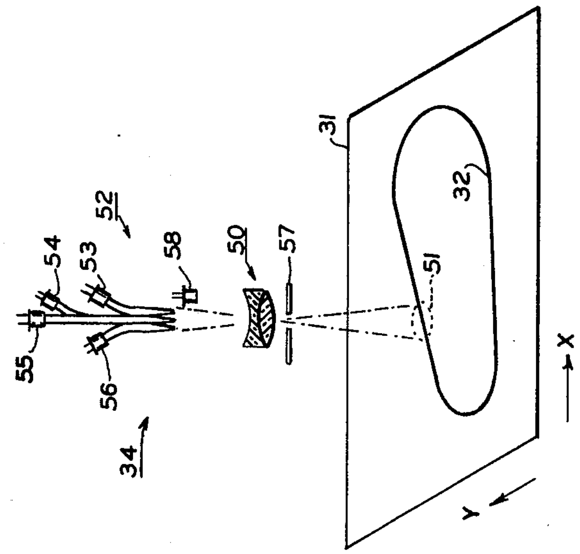
FIG. 3 represents a diagrammatic isometric view showing the principal components and relationships thereof of an optical sensing head.

Referring next to FIG. 3 wherein the illuminated master print 31 is shown with a line drawing 32 thereon, said print 31 being preferably of Mylar or the like. The line 32 is "read" by the optical head 34 wherein a lens system indicated as 50 projects the image of a small portion 51 of line 32 onto a specially arranged group of fiber optics 52 forming an optical decoding matrix. This lens system is contemplated as being a constant object-to-image distance type generally identified as a "zoom" lens system. In the contemplated matrix there are shown four optical fibers each having a miniature photocell or photosensitor 53 through 56 attached onto the opposite end of the optical fiber and responsive to the light flux received and transmitted by the optical fiber. An aperture plate or means 57 may be provided to preselect or adjust automatically a light level for the optical decoding matrix. A photocell or photosensitor 58, not a part of the reading matrix, is adapted to read the general light level of the drawing and act as a control means as hereinafter more fully described.

Figure 3A:
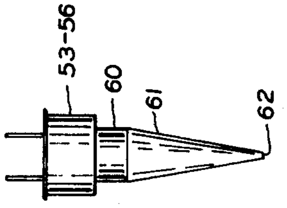
FIG. 3A represents a side view in a greatly enlarged scale of an optical fiber with the fiber having a tapered end.

Referring next to FIG. 3A there is shown, in a greatly enlarged scale, an optical fiber 60 having a tapered or conical distal portion 61. This taper may be one to two inches in length and have a reduction extending from a body diameter of about one-tenth of an inch to a five-thousandths of an inch diameter at the focal end 62. The major diameter is optically connected to a photosensitor such as one of the members 53–56. The fiber optics 60 may be incoherent fiber-bundle as they are required to "read" or conduct only a light or illumination level rather than an image.

Figure 4:
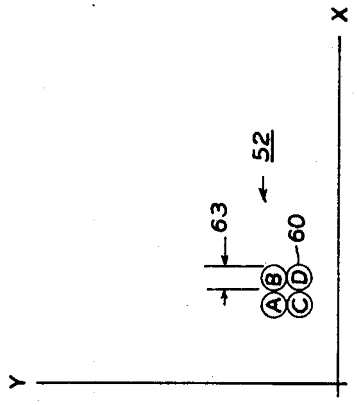
FIG. 4 represents a plane view showing the simplest (rank two) optical decoding matrix of the fiber optics.

In the preferred embodiment of the optical head 34 the optical decoding matrix consists of four optical fibers arranged in an equidistant spacing as shown in FIG. 4. Each image or focal end 62 is adapted to read a circular area of the master print of a dimeter 63 which may be five-thousandths of an inch or less depending upon the magnification of the lens system 50. The resolution of the optics is determined by the selection of the fiber diameters and the magnification provided by lens system 50. The circular areas 60 A, B, C and D are in a precisely square pattern adapted to coincide with the X and Y coordinates.

Figure 5:
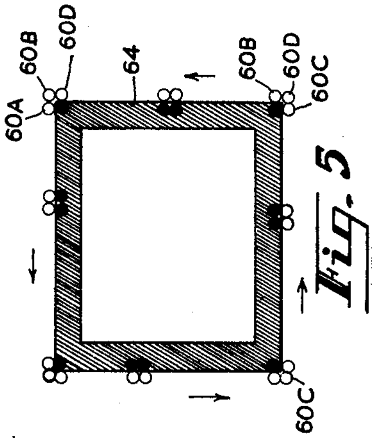
FIG. 5 represents a plane view of a typical master print (with magnified line thickness) showing the projected optical decoding matrix disposed upon it in typical positions while the optical head is in progress of reading the outside edge of the master print.
Figure 6:
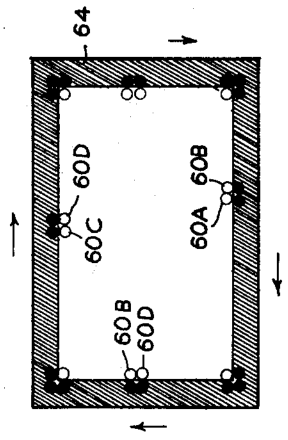
FIG. 6 represents a master print similar to that of FIG. 5 but showing a progression of the representative projected positions of the optical decoding matrix as it reads the inside edge of the print.

Referring next to FIGS. 5 and 6, there is shown a rectangular two-dimensional configuration or line 64 representing the magnified image of a master print to be traced. In FIG. 5 the four fiber optics 60 of the simplest optical decoding matrix 52 (FIG. 4) are shown as reading the outer edge of the line 64. The light circles represent those fiber ends of the decoding matrix which are illuminated while the dark circles indicate the fibers being obscured by the line 64. Line 64 may be of any desired thickness or the entire area within line 64 may be dark like a template, pattern or piece part. In another version the line 64 may be light and the background dark. The optical head 34, as it is moved, is precisely guided by the control system so as to follow the outside edge of line 64. The position of the optical decoding matrix in the center part of the four sides of the rectangle represents an optically balanced (zero error) system for unilateral motion wherein two fibers are fully in the dark while two are fully in the light. As the optical head 34 traces the line 64, for example counterclockwise as indicated by the arrows, the fiber optics 60 (designated A, B, C and D in FIG. 4) will go from light to dark or from dark to light as shown at the corners. This information is used by the DTL 40 to determine the pulse sequence for the positioning of the optical head as more fully described hereinafter.

When the inside of line 64 is to be "read" or the item to be reproduced is a template, pattern or piece part having a hole or inside contour, the optical head is caused to read the inside of the line 64 as shown in FIG. 6. As indicated by the arrows, the head may move in a clockwise direction with the fiber optics A, B, C and D going from a light to a dark condition at the corners. This information is used by the DTL 40 to program the subsequent pulses as more fully described hereinafter. Although shown as rectangles, the lines 64 may be any drawn shape. The geometry of line 64 and the "reading" thereof is precisely reproduced in the movement of the slave positioner 26.

It should be pointed out that the opto-graphical memory 25 is illustrated in FIG. 2 may drive simultaneously several slave positioners like positioner 26. In the plural version the lead line 44 is connected in parallel to the drivers of like individual positioning devices.

DESCRIPTION OF THE OPTICAL SENSING AND OPTICAL DECODING SYSTEM

The translation of a drawing or master print into a sequence of digital numbers which in turn controls (through the DTL and driver system) the proper positioning motor of a slave mechanism or machine tool is the responsibility of the optical sensing and decoding system which is an integral part of the optical head 34 (FIG. 2).

Reflected (or transmitted) light (FIG. 2) from or through the drawing or master print 31 enters the optics 50 of the optical head 34. The image of a small portion 51 of the drawing 31 is projected onto the bottom surface or ends 62 of the optical decoding matrix 52. The lens system, which is only symbolized by 50, is designed to be capable of magnifying the object in a range of one-half to ten times in size. The optical decoding matrix in its simplest form consists of four fiber optics 52 arranged as depicted in FIG. 4 The image of object 51 is disected by the decoding matrix and transmitted through the four fiber optics to four miniature photosensitors 53 through 56.

Depending upon the relative position of the optical head and the line on the drawing, some photosensitors will receive more light than others. The electrical output of a photosensitor is proportional to its illumination. The amplified output signal of each photosensitor is analyzed by individual comparators 66 through 69 as to be hereinafter described in conjunction with FIG. 10. The comparator circuit decides whether the output of a photosensitor is below or above a preset level. When below the threshold level the comparator indicates "0," when above the preset level the comparator indicates "1." In this contemplated circuit "how much below or above" the threshold level is immaterial. The output ("0" or "1") of the four comparators is then stored in a register. There are sixteen possible combinations of outputs which may be provided by the matrix of four fiber optics and each combination is represented by a "word." The "word" stored in the register is represented by a binary number. It will be shown that each binary number of the sixteen combinations may be translated into a positioning step having a definite direction. Further details of the digital transistor logic DTL system 40 is described hereinafter.

Figure 9:
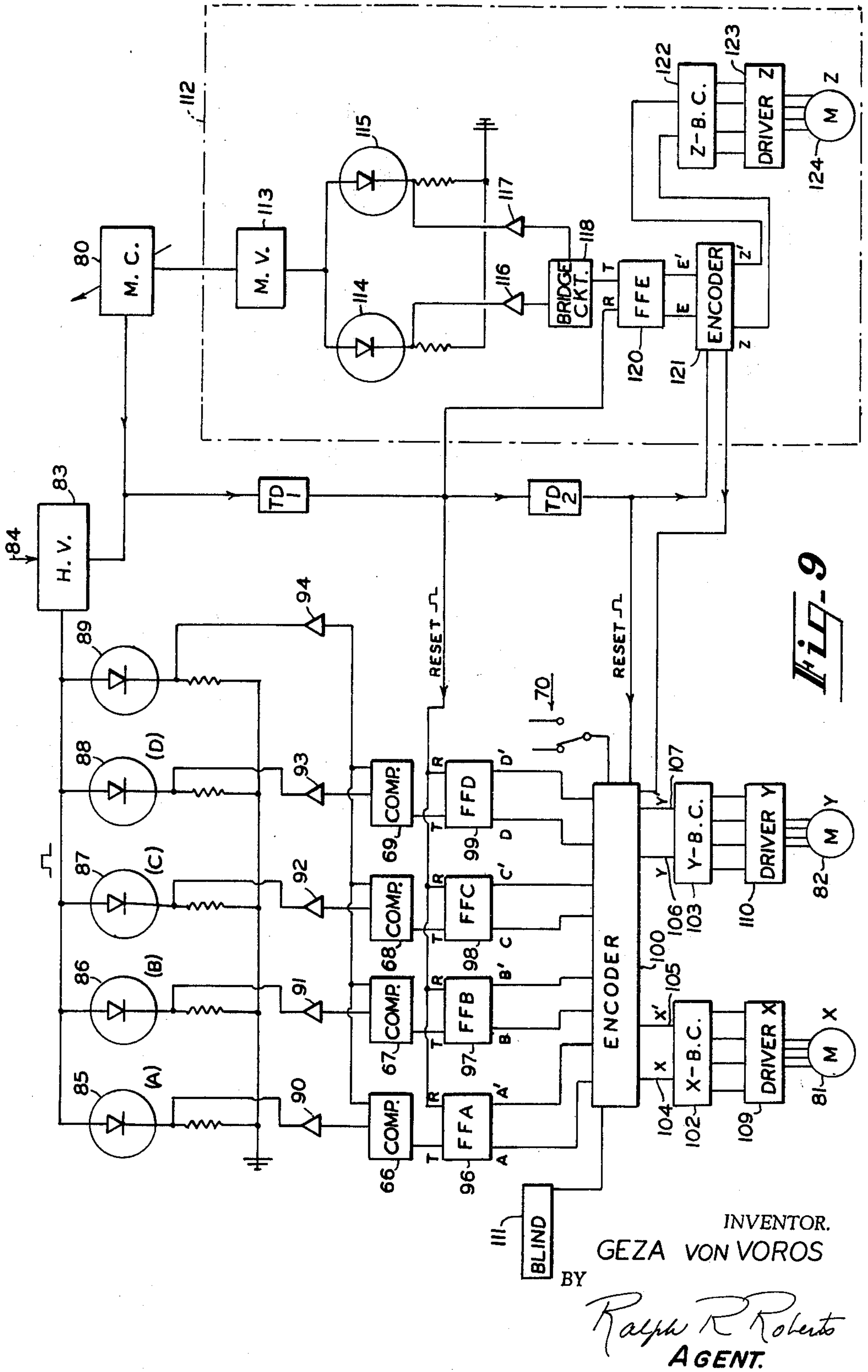
FIG. 9 represents a simplified electronic control circuit of the Opto-Graphical Memory.

The photo transistor 58 in FIGS. 3 and 9 receives only an average light flux from the illuminated print. Its output aids the comparators to correct the threshold level of light resulting from the aging of the light source or from other influencing factors.

In the two rectangular drawings of FIGS. 5 and 6 the simple rectangular geometry is chosen only for ease of description. The four fiber optics 60 are arranged in a precise square as in FIG. 4 and are aligned with respect to the coordinate system. Referring to FIG. 5, the optical head is shown as tracing the outside edge of line 64 in the counterclockwise (C.C.W.) direction. The illumination of the four photosensitors displays a set of binary numbers as the optical head progresses along the line. In the following table the binary numbers as well as their decimal equivalents are tabulated. To each number a stepping direction is assigned which uniquely determines the motion of the optical head 34 for the next step. For example, assuming that the momentary position of the decoding matrix with respect to the line is the position shown in the upper right corner of FIG. 5. Photosensitors attached to 60A, 60B and 60D are illuminated representing "1" while 60C is in darkness representing a "0" bit. Writing this binary number in the order of A, B, C, D, the optical decoding matrix is read as $1101_2=13_{10}$. It is also evident that when tracking in the C.C.W. direction, the following step should be in the minus $x$ direction. Thus the binary number $1101_2$ represents a stepping command in the minus $x$ direction. It should be noted, however, that when tracking in the clockwise direction the binary number $1101_2$ must represent one stepping command in the minus $y$ direction. Thus a unique set of directional commands must be assigned to each binary number, depending whether the desired tracking is in the clockwise or in the counterclockwise direction. As is hereinafter more fully explained in conjunction with FIG. 18, the operator may freely select the desired tracking direction by actuating a control switch 70 (FIG. 9).

Similarly a set of directional commands may be assigned when tracking the inside edge of line 64 as illustrated in FIG. 6. The various combinations are listed in the following table which serves as a truth table for the design of the encoder.

Figures 7, 8, 16, 19A, 19B, 19C, 19D, 19E, 19F, 19G, 19H:
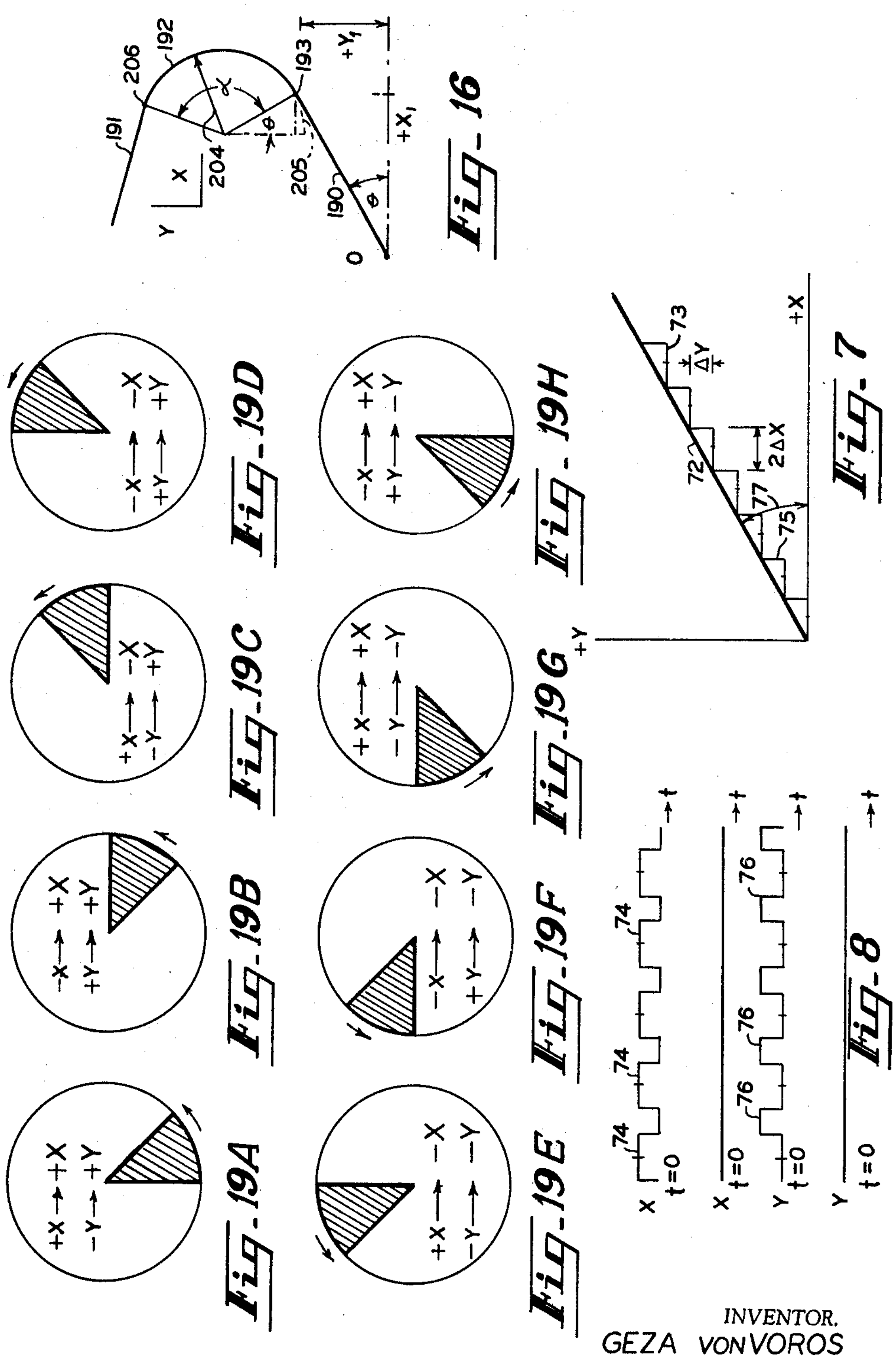
FIG. 7 represents a magnified view of a straight line in the Cartesian coordinate system and its digitalized version showing a representation of an actual contour of tracking by the optical head.
FIG. 8 represents a diagram of the pulse (stepping) sequence versus time generated by the optical head as it reads the line of FIG. 7.
FIG. 16 represents a plane view of a fragment of an engineering drawing, the fragment consisting of a pair of straight lines each having an angle of deviation $\theta$ to the $x$ axis or abscissa the lines connected to an arc of fixed radius and determined angle $\alpha$.
FIGS. 19A through 19H represent the eight octants of a circle and the corresponding terminal connections of the Opto-Graphical function generator to the writing head.

As the "reading" of a line cannot provide a condition where the optics are all light or all dark, such readings (when received) are in error and the "blind" reading causes a signal to shut down the equipment. In like manner the combinations where optics A–D "read" one light level and B–C "read" the other level cannot occur, hence no step command is assigned in the following table.

each plus $y$ step as shown in FIG. 7 is in a greatly exaggerated scale whereas in reality the contemplated steplength is equal to one-thousandth of an inch.

Curves, circles and combinations thereof with straight lines are "read" by the optical head 34 and like movements of the slave positioner 26 are also provided. As the accuracy of the resulting movements is dependent upon the accuracy of the line 32 (FIG. 2) being followed, it is important that the drawing have a line which is as accurately formed as is the required precision of the workpiece. The accurate production of such a master print is hereinafter described.

DESCRIPTION OF THE ELECTRONIC CONTROL CIRCUIT

The sensing mechanism of the optical head as above described includes a sensing and decoding system. It has also been noted above that, depending upon the direction in which the next step is to be taken, a unique binary notation is assigned. These binary notations are trans-

DECODING RULES FOR A QUADRATIC ENCODER MATRIX

[Truth Table]

| Decimal Notation | Photosensitor | | | | Tracking: Outside Edge | | Tracking: Inside Edge | |
|---|---|---|---|---|---|---|---|---|
| | A | B | C | D | C.C.W. | C.W. | C.C.W. | C.W. |
| 0 | 0 | 0 | 0 | 0 | Blind | Blind | Blind | Blind. |
| 1 | 0 | 0 | 0 | 1 | $+x$ | $-y$ | $-y$ | $+x$ |
| 2 | 0 | 0 | 1 | 0 | $-y$ | $-x$ | $-x$ | $-y$ |
| 3 | 0 | 0 | 1 | 1 | $+x$ | $-x$ | $-x$ | $+x$ |
| 4 | 0 | 1 | 0 | 0 | $+y$ | $+x$ | $+x$ | $+y$ |
| 5 | 0 | 1 | 0 | 1 | $+y$ | $-y$ | $-y$ | $+y$ |
| 6 | 0 | 1 | 1 | 0 | Degenerate | Degenerate | Degenerate | Degenerate. |
| 7 | 0 | 1 | 1 | 1 | $+y$ | $-x$ | $-x$ | $+y$ |
| 8 | 1 | 0 | 0 | 0 | $-x$ | $+y$ | $+y$ | $-x$ |
| 9 | 1 | 0 | 0 | 1 | Degenerate | Degenerate | Degenerate | Degenerate. |
| 10 | 1 | 0 | 1 | 0 | $-y$ | $+y$ | $+y$ | $-y$ |
| 11 | 1 | 0 | 1 | 1 | $+x$ | $+y$ | $+y$ | $+x$ |
| 12 | 1 | 1 | 0 | 0 | $-x$ | $+x$ | $+x$ | $-x$ |
| 13 | 1 | 1 | 0 | 1 | $-x$ | $-y$ | $-y$ | $-x$ |
| 14 | 1 | 1 | 1 | 0 | $-y$ | $+x$ | $+x$ | $-y$ |
| 15 | 1 | 1 | 1 | 1 | Blind | Blind | Blind | Blind. |

NOTE.—1. Photosensitor illuminated represents "1"; 2. Photosensitor in the dark represents "0"; 3. C.C.W. outside=C.W. inside; 4. C.W. outside=C.C.W. inside.

DIGITAL "READING" OF A LINE, FIGS. 7 AND 8

The relation between the geometry of a line to be read and the corresponding sequence of control pulses to the stepping positioners (motors) 36 and 37 of both the optical head 34 and to like positioners of the slave positioner 26 is illustrated in FIGS. 7 and 8.

The $x$ and $y$ axis of FIG. 7 is representative of the $x$ and $y$ axis of motion of the opto-graphical memory and the slave positioner 26.

The geometry of a line 72 to be read by the optical memory is given by FIG. 7 in graphical form. In this example it is expressed mathematically as $y=\frac{1}{2}x$. The line shown in FIG. 7 may be a section of an engineering drawing or master print and may have any other desired geometry. The straight line 72 was chosen for sake of simplicity for the following description. It is assumed that at $t$=zero time the optical head is at the original position. By applying the encoding rules presented above it is shown that two steps 73 are taken in the plus $x$ direction by the positioners after the operation is started. Those two steps 73 are indicated by two positive $x$ pulses in FIG. 8 indicated by the first double pulse 74. After the completion of these two pulses the optical encoding matrix indicates a required pulse in the plus $y$ direction. Pulses to the plus $x$ positioner are stopped as well as the corresponding optical head motion and one step 75 is made in the plus $y$ direction. This pulse is illustrated in FIG. 8 as a first plus $y$ pulse 76 at the left-hand side. As the optical head proceeds to read the line 72, the sequence of plus $x$ 73 and plus $y$ 75 steps are repeated. The correspondence between the mathematical formula for an angle 77 of the line and the pulse sequence for reading such a line is obvious. The "reading" of line 72 with two plus $x$ steps for lated into commands to the $x$ and $y$ positioning steppers by the logic system through corresponding drivers. A simplified control circuit is illustrated in FIG. 9.

In this circuit a variable speed multivibrator 80 serves as a master clock by which the rate of stepping of both the $x$ and $y$ positioning motors 81 and 82 are controlled. These motors may be the motors 36 and 37 of FIG. 2. The speed or clock-rate of this multivibrator 80 is set by the operator depending upon the required tool or writing speed which he determines freely. Each pulse from the master-clock will trigger a monostable multivibrator 83 which in turn receives from an input lead 84 a bias voltage and feeds this bias voltage to photosensitors 85, 86, 87, 88 and 89 for a definite constant duration. Photosensitors 85, 86, 87, 88 and 89 are identical to photosensitors 53, 54, 55, 56 and 58 respectively in FIG. 3. Besides the four photosensitors or scanning cells 85 through 88, an additional photosensitor or compensating cell 89 (which is identical to 58 in FIG. 3) is provided in the optical head. The function of this compensating cell 89 is to correct for changes in the illumination of the master print. This compensating cell 89 automatically adjusts the threshold level of comparators 66 through 69. It is to be pointed out that the pulse-width of the master-clock 80 is constant and independent from the clock-rate. The output of the respective photosensitors is then amplified through pulse amplifiers 90, 91, 92, 93 and 94 so that the pulses coming from the output of these pulse amplifiers are entering the four compensators 66, 67, 68, 69. The light reading level of these compensators is set by photocell 89 as described above.

Depending upon the illumination level of the corresponding photocells, each comparator will deliver a definite "1" or "0" signal towards its connected register flip-flops 96, 97, 98 and 99. As a result the four corresponding flip-flops in the register are set to either "zero" or "one." The binary number is now stored in the four flip-flops. The output of the four flip-flops 96 through 99 is connected to an encoder 100. A delayed pulse from the master-clock is adapted to reset the four flip-flops 96 through 99. Therefore, the binary notations stored in the flip-flop registers are transferred to the encoder 100. The output of the four flip-flops 96 through 99 represents a binary number identical to one of the numbers tabulated above. The required command for the next step is given by the encoder 100 to either an $x$ or $y$ basic counter 102 or 103. It is assumed that the encoder 100 is already programmed for "inside" or "outside" tracking of a line by switch 70.

The function of the encoder 100 is described as follows: (a) It translates a binary number into one pulse which is supplied to one of four output leads 104, 105, 106 and 107 and initiates one step in the desired direction; (b) the encoder 100 is designed to prevent any simultaneous pulse output; (c) the output of the encoder is transferred to either basic counter $x$ 102 or $y$ 103 depending upon which positioning motor is to be actuated. These basic counters may be commercial items such as is listed in the Logic Handbook of the Digital Equipment Corporation of Maynard, Mass. and identified in catalog C–105 dated 1967 and shown on page 198 of this catalog; (d) the output of basic counter 102 is connected to driver 109 and the output of basic counter 103 is connected to driver 110. The output of driver 109 is connected to the stepping motor 81 and the output of driver 110 to the stepping motor 82. These drivers may also be commercial items as listed in the same Logic Handbook on pages 198 and 199; (e) an excited basic counter supplies the required pulse sequence to the four leads of the connected stepping motor; (f) a time-delayed pulse to the encoder 100 resets the encoder for the next formation and (g) the prescribed sequence is repeated for each pulse given by the master clock 80. A signal from the optical head which produces a "word" $0000_2$ or $1111_2$ will result in the actuation of a "blind control" 111. The output of the "blind control" may be a light and/or audible signal or the like and it is contemplated that the encoder 100 is disconnected from the motors 81 and 82 until the blind indication is corrected.

In the right hand portion of FIG. 9 there is shown a representative additional circuit as indicated within a dashed line 112 which representative circuit is used for three-dimensional tracking and positioning. This additional circuit portion includes a monostable multivibrator 113 which feeds a bias-voltage to scanning photosensitor 114 and compensating photosensitor 115. Pulse amplifiers 116 and 117 feed the signal from the photosensitor to a bridge circuit 118 whose output triggers a flip-flop 120. The output of flip-flop 120 is then fed to encoder 121 which is connected so as to be an integral part of encoder 100.

The output of encoder 121 is fed to basic counter 122 and thence to driver 123 which in turn actuates the "$z$" stepping motor 124. It is to be noted that in this three-dimensional system one and only one stepping motor is actuated for each pulse of the master-clock 80, thus the inhibiting property of the encoder 100 is extended for movement in all three dimensions.

The encoders 100 and 121 are designed as code-operated switches constructed of diodes obeying the decoding rules of the truth table given above. Although the truth table as given is for two-dimensional tracking, its extension to a three-dimensional system is obvious.

For two-dimensional guiding or "reading" the circuit portion enclosed by the dashed line 112 is omitted.

DESCRIPTION OF THE OPTO-GRAPHICAL MEMORY FIG. 10

Figure 10:
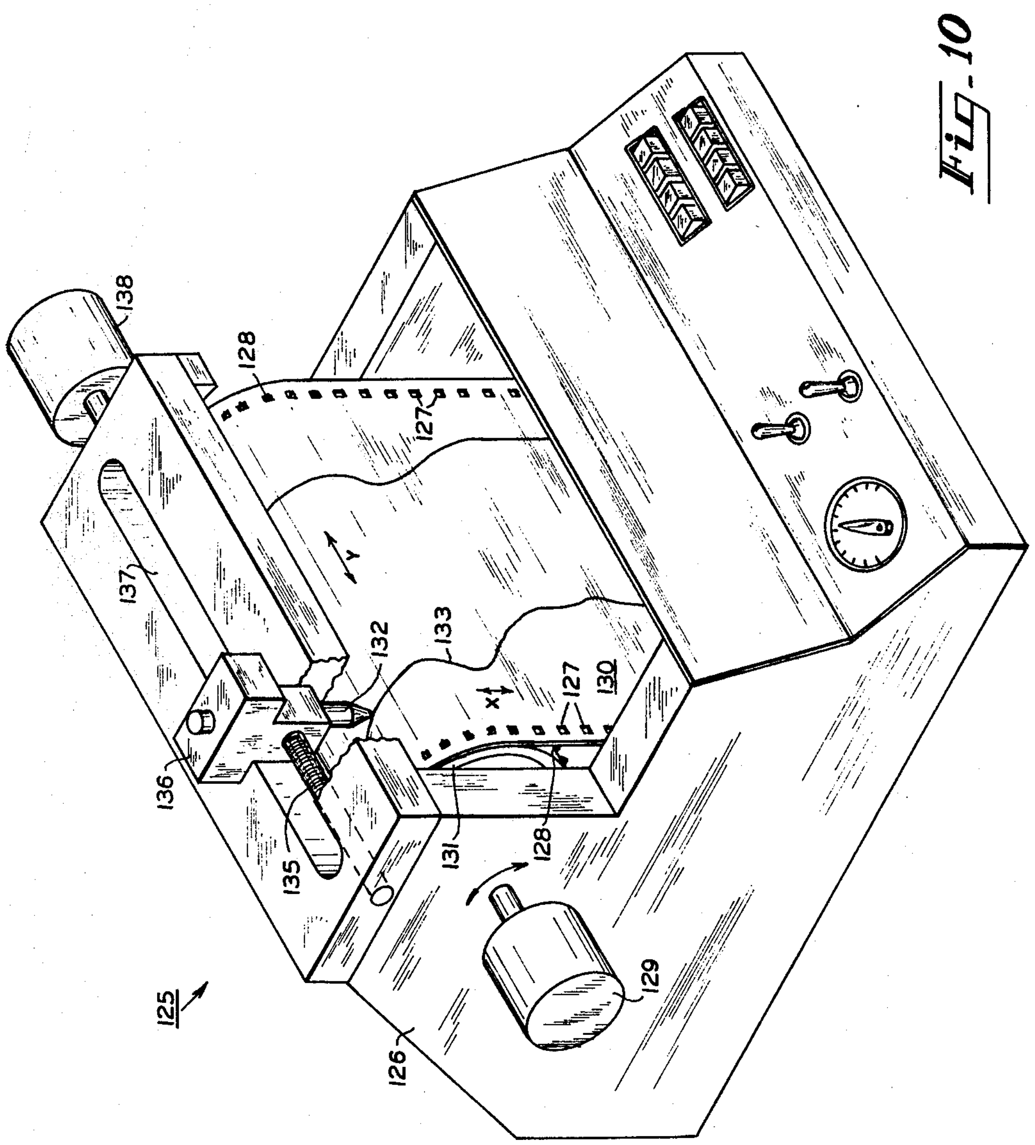
FIG. 10 represents an isometric view of a typical embodiment of the Opto-Graphical Memory (Read-White System) adapted to read master prints of determined width and freely chosen lengths.

Referring next to FIG. 10, there is shown an isometric view of an alternate opto-graphical memory providing the same service as the read-write system 25 shown in FIG. 2. This alternate memory is adapted to read master prints of extended lengths. The apparatus is generally indicated as 125. This unit is preferably contained in a housing 126 which may be of rigid metal or plastic. A master print or drawing 130 for use in this apparatus has formed in its longitudinal-edge portions a series of precisely sized and positioned apertures 127 which are adapted to accurately engage the teeth of two sprockets 128 carried and rotated by a shaft means driven by a rotary-stepping actuator 129. A heavy removable transparent plastic shield (not shown) is adapted to engage the opening in the front of the housing 126 so that the operator may have a direct observation of the tracking of the master print or drawing 130. This shield, when mounted on the cabinet, is contemplated to seal the cabinet so that the housing protects the master print from dust and dirt and other impurities in the air.

Each master print is precisely perforated near both edges so as to be moved by the stepping actuator 129. The print as moved by the sprockets in one or the other direction is stepped in either the plus or minus $x$-direction. The master print 130 is carried by and/or slides upon a transparent plastic or glass cylinder 131 within which there is preferably provided a light source not shown. The excess length of the master print hangs down on both sides of this cylinder and is folded to lie inside the bottom portion of housing 126. The light source within the transparent cylinder 131 provides the necessary illumination for the master print so that an optical head 132 which is located in the vertical axial plane of the transparent cylinder may read a line 133 on the master print 130. This optical head 132 is reciprocated by a precision ball screw drive 135 or the like. This head is precisely aligned and is movable in said plane by means of a T-block 136 or the like which is slideable in a guide slot 137. The optical head 132 is moved back and forth by the actuation of a stepping motor 138 which is adapted to rotate the ball screw drive 135.

The necessary manual control switches for "inching" the positioning of the optical head with respect to the line on the print 130 are symbolically shown on the front panel of the console of the housing 126. Included are switches controlling the power to the apparatus and a dial to set the clock-rate of advance. This clock-rate may be used to indicate the tool speed of the slave positioner. The manual inching switches are used to locate starting points of the drawing line and position the optical head. Both stepping motors have the necessary gear reducers, not shown, which provide the required uniform step-width in both the $x$ and $y$ directions. It is to be noted that the far side of the housing 126 has its sidewall contoured so as to provide access for the insertion and removal of the master print 130 on and off the cylinder 131. However, this suggested access means is merely a matter of selection and other arrangements may be made such as having the top adapted for opening or removal or by providing a slot and a self-threading mechanism through which is inserted the master print.

The optical head 132 in FIG. 10 may be replaced by a writing pen and the positioning motors 129 and 138 are then controlled by an opto-graphical programmer as described hereinafter or by one of the sources given in FIG. 1. Such a pen and controlled actuation is adapted to produce a master print upon a film transported by cylinder 131. Thus, by the simple exchange of the optical head for a writing head the reading system becomes a writing system. As is described below, the line thickness (produced by the writing head) may be freely chosen by the operator and (the line thickness) may carry a definite significance in some applications.

WRITING INFORMATION INTO THE MEMORY

The reading system of the opto-graphical memory has been described in detail above. In this description the assumption was made that a drawing or master print with the desired accuracy is available. It is well known, however, that "hand made" drawings may have scale errors of one one-hundredth inch or more; therefore, the precision of a guided machining process utilizing such engineering drawings is limited to about that accuracy. In some cases (welding, flame-cutting, etc.) an error one one-hundredth or even greater is acceptable. For precision machining, however, the drawing cannot have an error in excess of one-thousandth of an inch. A programming device capable of producing drawings or master prints with an accuracy of one-thousandth of an inch or better is necessary and is provided by this invention. This programming device may be an integral part of the optical memory or may be used separately as a highly accurate drawing device. This opto-graphical programming device consists of: (a) a function generator; (b) an optical sensing and decoding system (identical to the prescribed reading system), and (c) a logic and positioning system with a writing or printing head (similar to the units shown in FIG. 2 (25) and FIG. 10 (125) but exchanging the optical head for a writing or printing head).

Figure 11:
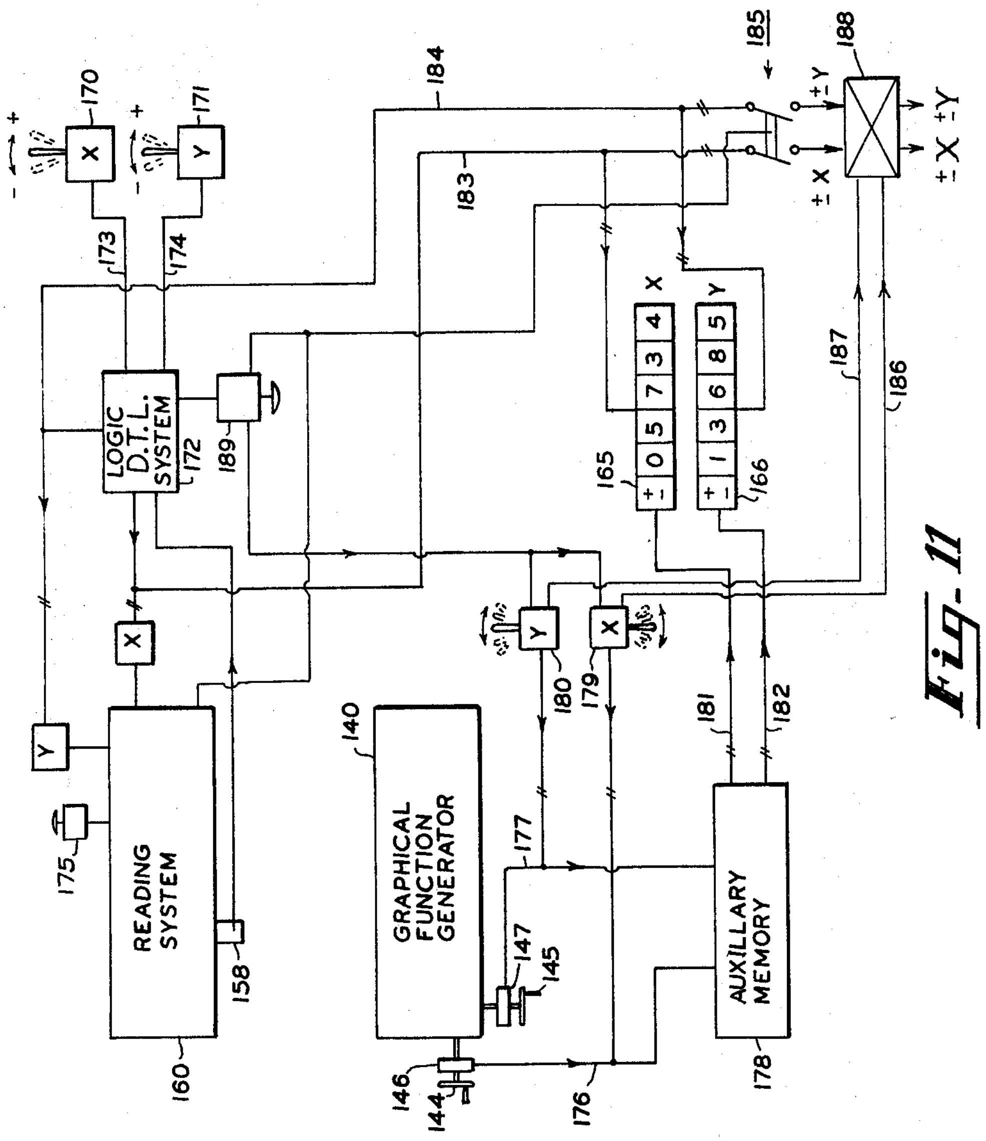
FIG. 11 represents a block diagram of the programming device with the graphical function generator and its reading system.

A block diagram of the graphical programming device is shown in FIG. 11. Construction of the function generator with its integral reading and positioning system is depicted in FIGS. 12 through 15. A simplified theory of operation is described by examples illustrated in FIGS. 16 through 20.

THE OPERATION PRINCIPLE OF THE GRAPHICAL FUNCTION GENERATOR

Any desired geometry may be displayed accurately with a set of precision made templates. An engineering drawing or even just a sketch or idea may be reproduced with great accuracy by the proper arrangement of straight lines, sections of circles, ellipses, etc. fabricated with high precision and made of light-absorbing or reflecting material. When such a group of templates are placed under the optical head 34 of FIG. 2, and assuming an adequate brightness difference with respect to the background is provided, the reading system (described in previous sections) will track the outer (or inner) edge of the selected template or templates accurately and simultaneously will control a writing or printing device such as described above in conjunction with FIG. 10.

The function generator is a device containing a straight-edge and the necessary precision-made curve elements. The operator may produce or transcribed any desired geometry by a dial or push-button control either manually or automatically and make the optical reading system, which is an integral part of the programming device, follow the prescribed geometrical path. The simultaneous control and movement of the writing system is then adapted to produce the master print on a mechanically stable medium such as Mylar or Kapton sheet.

CONSTRUCTION OF THE GRAPHICAL FUNCTION GENERATOR

Referring next to FIGS. 11, 12, 13, 14 and 15, there is shown an exemplified function generator 140 in which an illuminated table 141 is disposed below a reading system. This programmer includes a pair of precision lead screws 142 and 143 rotated by dials or handles 144 and 145. The ends of each screw are mechanically coupled to an analog-to-digital (AD) converter 146 and 147 which are each adapted to give a pulse signal for a determined angle of rotation of its connected shaft. In one exemplification, as reduced to practice, these pulses have been selected to provide a one-thousandth of an inch movement along either the $x$ or $y$ coordinate axis.

Above the illuminated table there is a precisely movable straight line edge for the optical head to follow. This accurately fabricated straight-edge 148 is fixedly and pivotally mounted at one end on vertical spindle 149 retained by means of a precise pivot bearing 150. This spindle 149 is the precise intersection of the coordinate axes $x$ and $y$. This straight-edge is carried on a pivoted support 151 having a slot 152 therein. This slot provides a precise guideway. A pin 153 vertically disposed and carried by block 154 is movable by screw 143 in the $y$ direction upon the rotation of the handwheel 145. Pin 153 engages the slot 152 to move and position support 151. A dovetail support bar 155 carried by screw 142 and on the other end by a ball bushing 156 and precision shaft 157 is movable in the $x$ direction by rotation of the handwheel 144.

Figure 14:
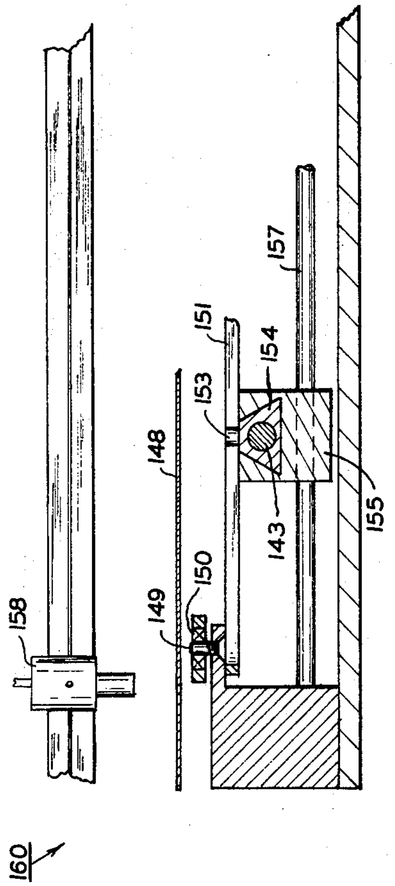
FIG. 14 represents a fragmentary sectional view of the graphical function generator showing the guiding mechanism of the precision straight edge, the view taken generally on the line 14–14 of FIG. 12.
Figure 15:
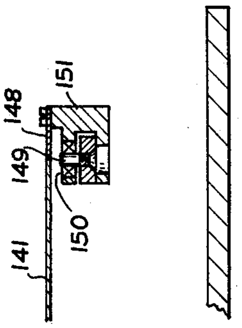
FIG. 15 represents a fragmentary sectional view of the pivot spindle construction for the support of the precision straight edge of the graphical function generator, the view taken on line 15–15 of FIG. 12.
Figure 13:
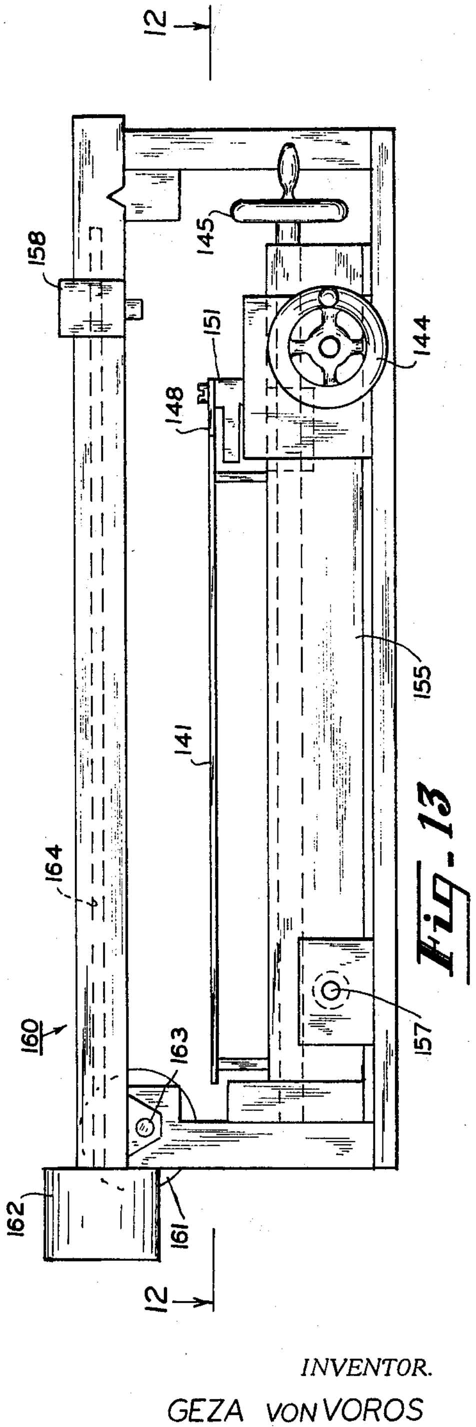
FIG. 13 represents a side view of the graphical function generator taken on line 13–13 of FIG. 12 and indicating the relative positions of the circle-template and movable straight edge disposed below a reading system.

Carried above the straight-edge member 148 is an optical head 158 similar to and movable as is head 34 in the reading system of FIG. 2. This upper reading system 160 as seen in FIGS. 13 and 14 is of a size so that the head 158 may scan the entire area of the table 141 below. This head is moved by stepping motors 161 and 162 as is head 34 in FIG. 2 with motor 161 rotating screw 163 to move the head 158 along the $x$ coordinate and motor 162 rotating screw 164 to move the head along the $y$ coordinate.

The AD converter 146 is connected to a digital visual display 165 and AD converter 147 is connected to a digital visual display 166. Both displays record or indicate the number of pulses provided by the movement of each lead screw. As for example, if each pulse corresponds to one-thousandth of an inch coordinate motion of pin 153, a movement of five inches is equivalent to five thousand pulses.

The slides and guides for both the $x$ and $y$ motion of the function generator 140 and reading system 160 thereabove is shown as dovetail and V-grooves, however, the use of balls to insure ease and precision of movement is contemplated for some or all slide members.

Also provided on the illuminated table 141 are a series of accurately drawn or engraved circular arcs having extents of forty-five degrees. These arcs are generally indicated as 168 and their proposed construction is shown and hereinafter more fully described in conjunction with FIGS. 19 and 20.

Referring again to FIG. 11, there is shown a block diagram of the graphical function generator and reading system of the apparatus of FIGS. 12, 13, 14 and 15, above described. In addition to the function generator 140 and the reading system 160, there is provided manual stepping switches 170 and 171 adapted to feed pulse signals to a DTL 172 through conductors 173 and 174. A reset 175 is connected so as to return the optical head 158 of the reading system 160 to a zero or origin position. The function generator 140 is also provided with leads or conductors 176 and 177 which are connected with AD converters 145 and 146 to an auxiliary memory 178 and also to setting and polarity-changing switches 179 and 180 providing for manually setting the number of pulses as well as the sign of the $x$ and $y$ coordinates described hereinafter. From auxiliary memory 178, a pair of leads or conductors 181 and 182 carry the signals to the visual displays and counters 165 and 166. Leads or conductors 183 and 184 carry signals from DTL 172 to switch 185 thence to leads to a writing or drawing system or slave positioner. Each of the setting and polarity-changing switches 179 and 180 is contemplated as having five positions. The center or neutral position refers to a zero or off condition. A first switch position to the right conditions the stepping motors for movement to the positive coordinate axis and a first switch position to the left conditions the stepping motor for movement to the negative coordinate direction. The switches 179 and 180 are connected through leads 186 and 187 to switching circuit 188. The function of this switching circuit (which may be a "gang" switch) is described below. A second position of switches 179 and 180 is adapted to start digital visual displays 165 and 166 so that the desired number of pulses in the positive direction (right) and in the negative direction (left) for both $x$ and $y$ coordinates may be set manually. The function of the actuation of this switching system is also described below. Switches 179 and 180 are connected to a "reset" switch and/or button 189. When this "reset" button is actuated, switches 179 and 180 are connected to a "reset" switch and/or

DRAWING STRAIGHT LINES WITH SELECTED SLOPE AND LENGTH

Referring next to FIG. 16 wherein part of an engineering sketch is shown and as an example, includes straight lines 190 and 191 connected by a circular section 192. This straight line 190 is determined (with respect to the origin O) by the $x_1$ and $y_1$ coordinates of point 193. The procedure of drawing this line with the programming device (thus graphically memorizing its geometry on the master print is described hereinafter.

The programming device seen in FIGS. 11 through 15 includes the precision $x$–$y$ positioning mechanism in which the position of the moving pin 153 is controlled by the $x$ handle 144 and $y$ handle 145. The straight edge 148 to be tracked by the optical head 158 is pivotally movable around fixed spindle 149 (which is also the origin, $x$=O, $y$=O of the coordinate system) and is positioned by moving block 154 and its slot engaging pin 153. The operator first sets the sign of the coordinates $x_1$ and $y_1$ (both plus in the example of line 190) by switches 179 and 180. He then dials the required coordinates $x_1$ and $y_1$ by rotating handles 144 and 145. The digital visual displays 165 and 166 as controlled by the AD converters 146 and 147 provides the necessary "check" for the proper position of coordinate point 193 and for the proper sign of the $x_1$ and $y_1$ coordinates. Notice that pin 153 is now in the same relation to spindle 149 as is point 193 to the origin "O" and as a result straight edge 148 is at the same slope as is line 190. In addition, the number of pulses generated by the AD converters 146 and 147 is now stored in the auxiliary memory 178. The optical head 158 is located at the origin "O" in its "reset" position.

When the "start" switch of the reading system is actuated, the optical head 158 is caused to track the straight edge 148 which is preferably coated or surface treated to provide a sharp contrast with respect to the illuminated table 141 background. Simultaneously with each pulse fed to the $x$ and $y$ stepping motors of the reading system 160, the writing device (which may be that of the apparatus described in conjunction with FIG. 10 or the slave positioner 26 of the milling machine or jig-bore for another version) is stepped in synchronism and in a like amount thus printing a line identical to the disposition of the guide-line and extent of straight edge 148 in the function generator and therefore that of line 190. Each pulse fed to the $x$ and $y$ positioners will subtract one number from the number of pulses stored in the auxiliary memory 178. This "negative-going" counting is visually observed on the digital visual displays 165 and 166. When the counting in the displays reaches the zero in both $x$ and $y$ directions appropriate control means stops the stepping automatically and actuates a "completed" signal (not shown). When the operator actuates the "reset" button 175, the optical head 158 of the reading system of the function generator is caused to return to the zero position 149. It is to be particularly noted that the "reset" procedure in the programming device does not change the previously reached final position of the stylus of the writing head. This is insured by opening the switch 185 automatically whenever buttons 175 or 189 are actuated. Although the programming is shown to be manual, it is understood that a fully automatized version of the dialing or programming procedure may be provided if and when it is so desired.

Figure 12:
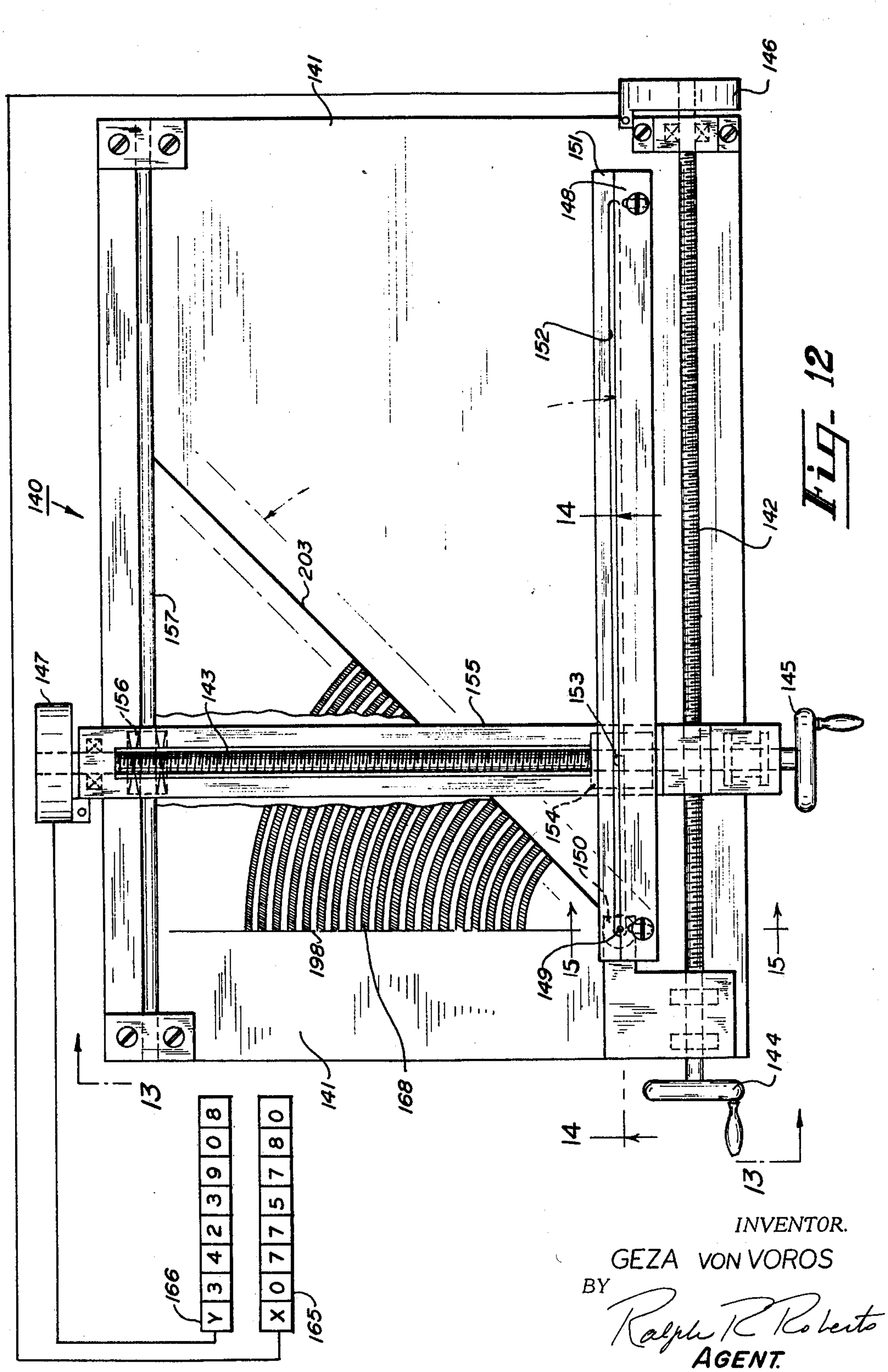
FIG. 12 represents a plane view of the lower level of the graphical function generator as it is adapted to display a straight line and circles with various radii, the view generally taken on the line 12–12 of FIG. 13.

As depicted in FIG. 12 it is contemplated that the rotation of the straight edge or guide-line 148 is limited to forty-five degrees. This degree of movement is sufficient to draw a line in any octant of the Carthesian coordinate system on a master print, provided that the proper interchange of leads between the reading and writing systems is made by the switching circuit 188. The ability to use only one octant to produce all and any required straight lines greatly minimizes the required size of the function generator. In FIG. 11 the output leads of the reading system are designated by small $x$ and $y$ while the leads leaving the switching circuit 188 and connected to the writing positioner motors are labeled by capital X and Y.

Figures 17A, 17B, 17C, 17D, 17E, 17F, 17G, 17H:
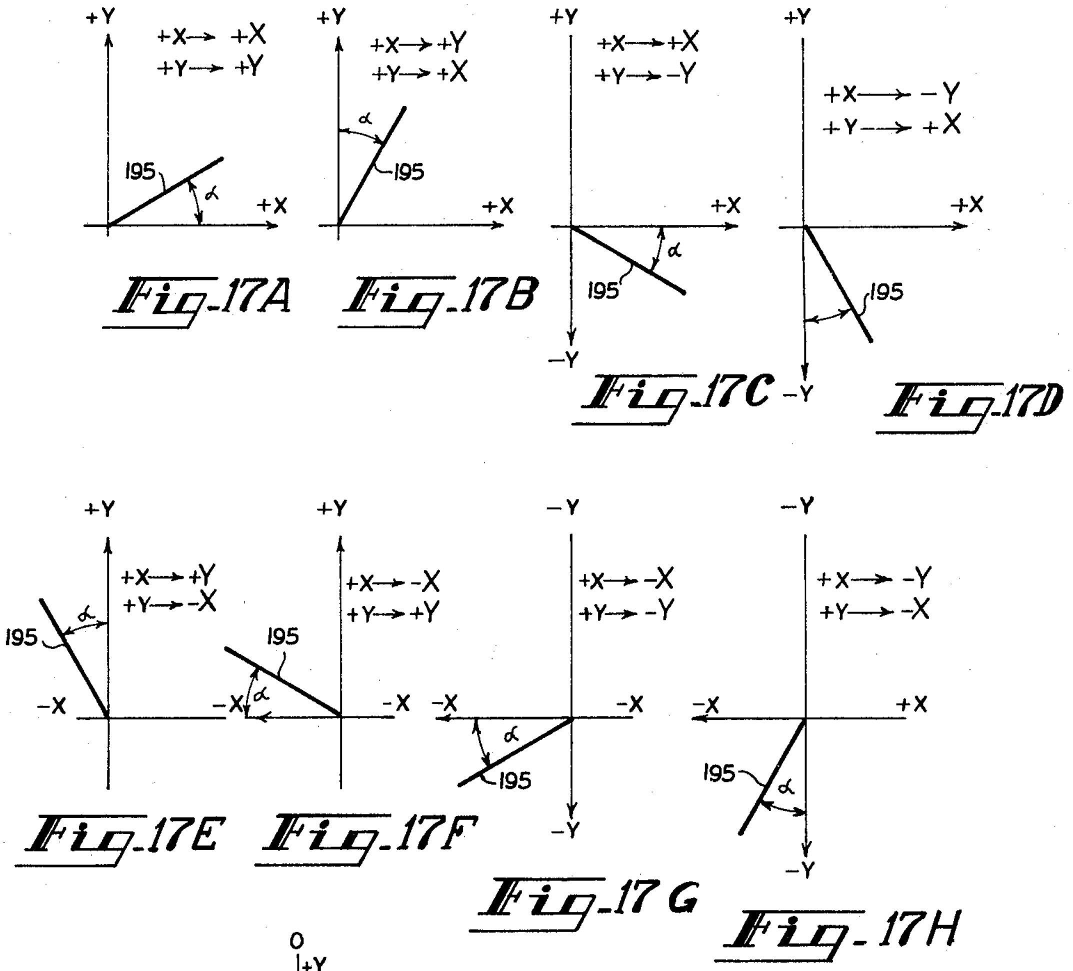
FIGS. 17A through 17H represent typical locations of a straight line in each of the eight octants in the two-dimensional Cartesian system and to "write" this line, the respective interconnections between the function generator and the writing system or a slave positioner such as a machine tool.

In FIGS. 17A through 17H the location of the printed lines resulting from the interconnection of the $x$, $y$ and X, Y leads is illustrated. In each instance the signal from the programming device is produced by tracking the edge of the straight edge 148 which is always located within the first octant of the coordinate system. The resulting line drawn is thus dependent upon the interconnections. In FIG. 17A the drawn line 195 lies in the first octant above the plus $x$ abscissa. In FIG. 17B the drawn line 195 lies in the forty-five to ninety degree octant, right of the plus $y$ coordinate. In FIG. 17C the drawn line 195 lies in the first octant below the abscissa plus $x$. In FIG. 17D the drawn line 195 lies in the forty-five to ninety degree octant to the right of the coordinate axis minus $y$. In FIG. 17E the drawn line 195 lies in the forty-five to ninety degree octant to the left of the coordinate axis plus $y$. In FIG. 17F the drawn line 195 lies in the first octant above the minus $x$ abscissa. In FIG. 17G the drawn line 195 lies in the first octant below the minus $x$ abscissa. In FIG. 17H the drawn line 195 lies in the forty-five to ninety degree octant to the left of the coordinate axis minus $y$.

The proper interconnections are automatically established by the sign and inching (multifunction toggle) switches 179 and 180 when the operator selects the sign of the coordinates. An interlocking circuit (not shown) is provided so as to prevent starting the tracking if the signs of the coordinates are not selected by the operator. Whenever reset button 189 is actuated these sign and inching switches 179 and 180 are returned to their zero position.

DRAWING CIRCLES WITH SELECTED RADII

Figure 18:
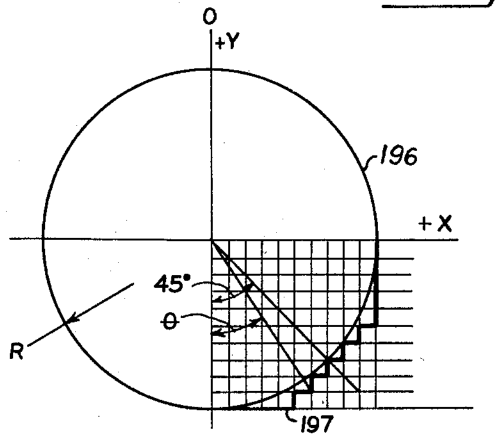
FIG. 18 represents a plane view of a circle and the typical step-wise linear tracing of one-quarter of the circle by an optical head.

Referring now to FIG. 18 and the circle 196 shown therein, the tracking of an arc by the optical head 158 is represented. The rectilinear steps of the digitalized positioning system, described above are illustrated by line 197. It should be pointed out that line 197 is symmetrical about the $\theta$=forty-five degree line.

In FIG. 12 a number of circular arcs 168 with various radii are illustrated and as shown, are positioned at the left-hand side of table 141. These arcs are printed with a high degree of accuracy (one-thousandth of an inch or better). Their mutual center is located at spindle 149. These arcs, having an extent of forty-five degrees, are preferably made with a high brightness-difference with respect to the background thus providing the necessary contrast for optical tracking. The function of these precision arcs is the same as the function of guide-line of straight edge 148 described above. When a circle or part of a circle with given radius R is to be drawn into the memory (master print) the optical head 158 is moved along the plus $y$ axis 198 to the circular arc having the desired radius R. The positioning of the optical head 158 is provided by switch 171 in FIG. 11. It should be noted that the plane of the circular arcs 168 is coincidental with the level of straight edge 148, thus the positioning mechanism for the straight edge 148 is below that level and thereby out of the focal plane of the optical head 158.

Figures 20, 21:
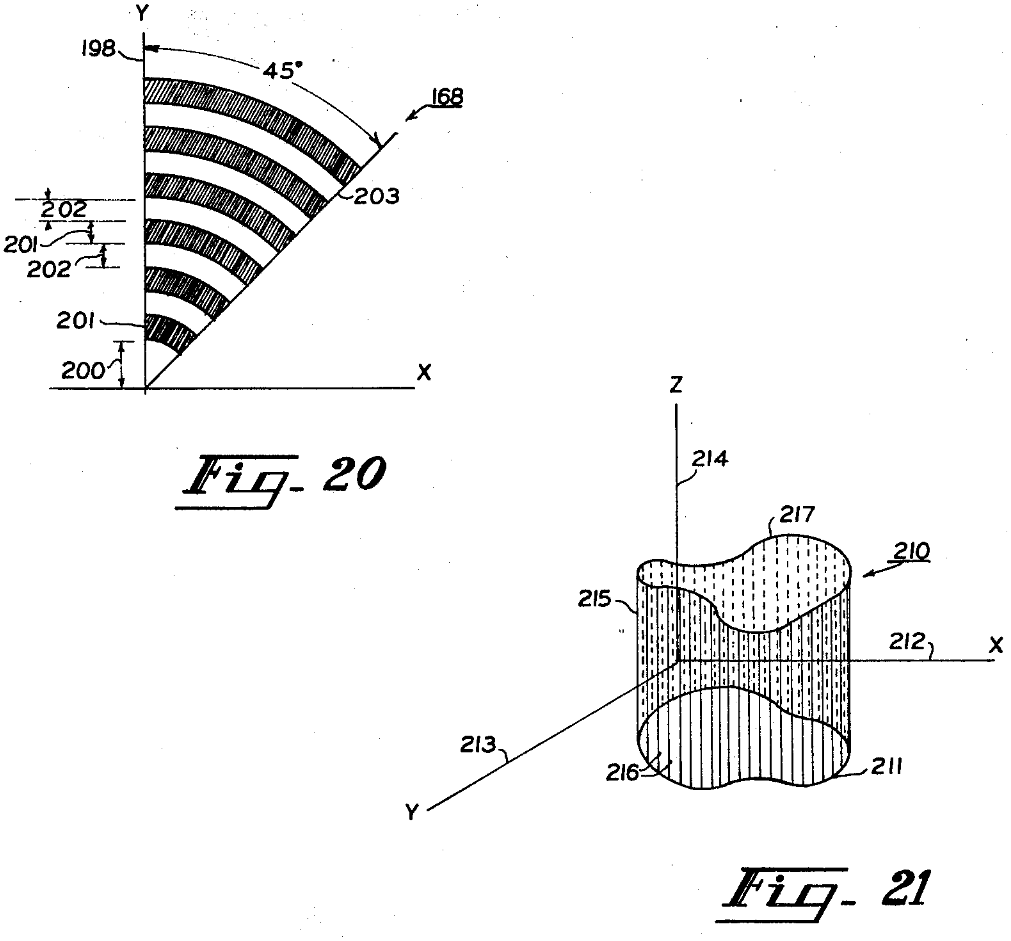
FIG. 20 represents a magnified portion of a circle template of the graphical function generator, the template adapted for tracking by the reading system to produce circles or portions of circles in the slave mechanism or in a writing system.
FIG. 21 represents a view of a space curve adapted for three-dimensional (i.e., $x$-$y$-$z$ coordinate) operation of the Opto-Graphical Memory and a slave positioner mechanism.

Referring to FIG. 20 there is shown an enlarged view of the circle template 168 which is contemplated to be precisely attached to the table 141. As the optical head 158 is adapted to read the edge of the line, both the inside and outside of the lines may be used in the writing or drawing of circles. As reduced to practice, the template is made in ten-thousandths of an inch increments with radius 200 being twenty-thousandths of an inch. The line width of arc 201 is ten-thousandths of an inch in width and all other lines are of a similar precision width. The spaces 202 between adjacent lines are also ten-thousandths of an inch in width resulting in a template having ten-thousandths of an inch increments. The line-width and spacing as shown and described in this FIG. 20 is only a matter of selection and any other line width and spacing may be made so as to provide the desired increments. Templates similar to template 168 may also be made interchangeable and attachable to table 141 so as to provide radii of desired values.

The space to the right of template 168 on the table 141 is available for the insertion of specified sets of curves such as ellipses and the like which may be desired for drawing typical recurrent applications. The replaceable nature and use of such templates is obvious and the versatility provided thereby indicates the ease of making a drawing of extreme accurracy. The drawing need not be a line drawn on Mylar and the like but may also be an etched, engraved or machined line on a metal or plastic plate. The writing head is contemplated as being equipped with a number of cylindrical styluses having different diameters. The line thickness of the drawing is merely a matter of selection by the operator. The advantage and uses for the changing line thickness is hereinafter more fully described.

After the determined movement along the plus $y$ coordinate has been completed the reading process of the optical head 158 is started with the lead tracking the selected circular arc. A synchronous motion of the slave positioner of the writing system (or machine tool, etc.) is provided by the interconnections between the reading and writing system in the same manner as described in conjunction with the tracking of a straight line.

As noted above, the stepping sequence for a circle is always symmetrical to the forty-five degree line. Therefore it is again sufficient to use an octant of a circle as guide-line. With a similar switching maneuver as described for the straight lines, any angle may be realized. FIGS. 19A through 19H illustrate the various terminal connections necessary to cover the three hundred sixty degrees of the circle. The output leads of the reading system are designated by small $x$ and $y$ and the input leads of the writing system by capital X and Y as above. It should be mentioned that the optical head 158 above the template always starts from the $x=O$ position of the arcs at line 198 which is the plus $y$ axis. Moving clockwise (C.W.) the tracking optical head 158 proceeds in a stepping sequence until it reaches the forty-five degree segment of the template which is a determined line 203, whence an optical limit switch (not shown) is actuated and the positioning mechanism of the optical head 158 will be switched from C.W. to counterclockwise (C.C.W.) tracking. Reaching the zero point or line 198 again actuates a limit switch to change the tracking back to the initial C.W. direction and so on.

This reciprocating motion of the optical head 158 continues until the total number of "absolute" steps is equal to the steps programmed into the auxiliary memory 178 required to accomplish the desired extent of angle which is desired to be drawn. It is understood that each time the limit is reached by the tracking optical head, either at the forty-five degree turning point (line 203) or the zero turning point (line 198), the switching circuit 188 is actuated and the terminals $x$, $y$ and X, Y are switched in accordance with FIG. 19.

In order to draw a section of a circle having radius R, tangent to a line (190 in FIG. 16) there are three parameters to be determined: (a) The radius R of the circle; (b) the initial or matching angle $\theta$, and (c) the determined angle of the circular section designated $\alpha$. These three parameters are depicted in FIG. 16.

In order to limit the motion of the optical head 158 to the angle $\theta$ it is necessary to determine the number of steps in the $x$ and $y$ direction which describes this angle. In other words, the function $$\theta=(R, n_x, n_y)$$

must be known by the operator. These values are determined either by calculation or, in a fully automatized version, the relation may be obtained by known computer technique.

For any particular angle $\theta$, the number of steps to be taken by the $x$ and $y$ positioners of the optical head 158 of the reading system may be calculated as follows: In accordance with FIG. 16 the angle is measured from the vertical axis of the coordinate system. The starting point or the origin of the coordinate system is chosen at point zero. When the circular section corresponding to $\theta$ is to be drawn, the number ($n_x$) of steps in the $x$ direction is determined as follows:

$$n_x=R \sin \theta$$

and the number ($n_y$) of steps in the $y$ direction is determined as $$n_y=R(1-\cos \theta)$$

Therefore if R and angle $\theta$ are given, the operator or a simple computer calculates $n_x$ and $n_y$ and programs these numbers into the auxiliary memory 178 by actuating switches 179 and 180. These stored numbers then appear on the visual numerical read-out display 165 and 166. Similarly to the limitation process described with the straight line programming, each step taken by the $x$ and by the $y$ stepping motor subtracts one number from the stored $x$ and $y$ steps. Upon reaching zero for both $x$ and $y$ steps, the tracking of the optical head 158 is automatically stopped and the "completed" signal indicates the end of the procedure.

In tracking a circle, both positive and negative steps may be taken by the positioner depending upon the quadrant in which the circle is being tracked. As far as the process is concerned, the data stored in the memory 178 and shown on the visual displays 165 and 166 is the total number of the $x$ and $y$ steps. The sign of the direction of the $x$ and $y$ steps in this case is insignificant.

DRAWING A CIRCULAR ARC TANGENT TO A STRAIGHT LINE

Referring again to FIG. 16, the procedure for drawing an arc, tangent to a straight line is as follows: Line 190 is drawn at a determined angle $\theta$ to coordinate $x$ and from origin zero continues to point 193 which is the tangent engaging point with an arc 192 having a determined radius 204. The process of drawing this straight line is described above. Line 190 is thus graphically memorized on the master print and the writing head is at the position which corresponds to point 193. Next the writing system is disconnected by actuation of switch 188. The optical head 158 is moved to an arc of the group 168 and having a radius equal to the radius 204 by the actuation of switch 171. The optical head 158 is then made to step through an arc 205 related to angle $\theta$ which the operator computes and reduces to an equivalent $x$ and $y$ stepping. After the optical head 158 traces the arc section 205 described by $\theta$, the head 158 is now at a position along the arc which corresponds exactly to point 193. The operator now computes the required number of steps to describe the angle $\alpha$ represented by arc 192. The corresponding $x$ and $y$ values are then programmed into the auxiliary memory 178. The connection between the reading head and the writing system is then reestablished and the start button is actuated. The optical head 158 starts reading the arc from template 168 and moves from point 193 to the end of the arc which is point 206. Whenever the optical head reaches the limiting forty-five degree angle of line 203 (FIG. 20), the terminals of the reading system toward the writing system are changed from the connections of FIG. 19A to those of FIG. 19B. The optical head 158 is also reversed as to its direction and starts to step counterclockwise toward the zero position of line 198. When it reaches the zero position the terminals are changed again to the connection of FIG. 19C whence the optical head is again moved clockwise toward the forty-five degree limit of line 203. This process continues until the determined number of steps $x$ and $y$ are exhausted from the auxiliary memory 178. The tracking is then stopped and the "completed" signal is actuated to indicate the end of the arc. The operator then positions the precision straight edge 148 in accordance with the slope of line 191 and by the prescribed method of drawing line 190 this line 191 is drawn.

THREE-DIMENSIONAL GUIDING

Figure 22:
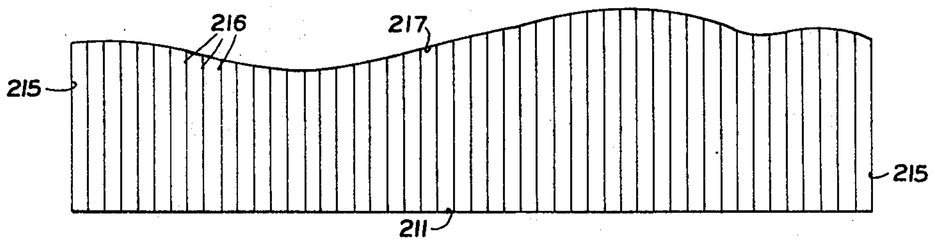
FIG. 22 represents the unfolded space curve of FIG. 21 wherein is indicated the constant step-width of the $x$-$y$ coordinate curve or line equated with the corresponding $z$-values.

The system described above for two-dimensional ($x$–$y$) operation is fully adaptable for three-dimensional ($x$–$y$–$z$) guiding as well. The extension of the electronic control system for the three-dimensional operation has been explained in conjunction with FIG. 9 above. In order to describe the three-dimensional operation, reference is made to FIGS. 21 and 22. In FIG. 21 a three-dimensional configuration or object 210 is represented. The plane view of this object is transcribed by line 211 shown in the $x$–$y$ plane, defined by the coordinate axes 212 and 213 correspondingly. The process of memorizing and reading back line 211 is readily followed in the manner of any $x$–$y$ line described above. In order to extend the operation to three dimensions, the system described above must also memorize and be capable of playing back the third or space dimension $z$, corresponding to the axis 214. The $z$ direction represents the height of the geometric configuration 210 shown in FIG. 21. If the contour surface is assumed to be cut along a line 215 and then unrolled as a strip, it would appear as in FIG. 22 whereby the left and right ends of the strip are the coinciding lines 215. Adjacent fictitious vertical lines 216 as shown in FIG. 22 are selectively positioned on equal precise spacings. The distance between adjacent vertical lines, as seen in FIG. 22, represents a determined step-width, usually one-thousandth of an inch. To each step in the $x$–$y$ plane a corresponding $z$ height is thus ordered. As seen in FIG. 21, line 211 represents the projection of space curve 217 into the $x$–$y$ plane. This curve is memorized on a master print. A plane curve such as 211, however, has no information about the third $z$ dimension. Therefore, a second master print must be made such as is illustrated in FIG. 22. The first master print may be called the plane-view of the space curve and the second master print may be called the $z$ or height-chart. The length of line 211 on the $z$ chart is the total length of the tracing path along the planeview. The curve line 217 which is the vertical distance above the plane $x$–$y$ is adapted to give a corresponding $z$ value for each point indicated by the vertical lines 216 extending upwardly from base line 211 as seen in FIG. 22. The tracking of the line 217 on the $z$ chart requires a one-dimensional tracking system which is synchronized with the $x$–$y$ reading system.

Assuming that the $x$, $y$ and $z$ master print or prints are available, it becomes clear that in order to obtain a continuous operation the two ends of the $z$ chart are preferably joined together and fed into an opto-graphical reading system such as shown in FIG. 10. A second optical head (similar to head 132) is moved to trace the $z$ chart in synchronism with the reading of the companion $x$–$y$ master print. The two reading (as well as writing) systems may be enhoused in an arrangement such as is shown in FIG. 10. When the $z$ strip of FIG. 22 is to be joined a simple joining procedure may be used requiring a tool similar to that used for joining movie films with matched transfer holes. The joined cylinder tape is inserted onto a second cylinder (not shown) and similar or identical to the $x$–$y$ master print reader as seen in FIG. 10. The $z$ drum control is adapted to step substantially and simultaneously every time a step is taken either by the $x$ or by the $y$ positioner and independently from the sign of the step. If there is no change in the $z$ direction, the $x$ or $y$ stepping continues until there is a step necessary in the $z$ direction whence an inhibitor circuit stops the $x$–$y$ stepping until the $z$ correction is completed then the $x$–$y$ stepping proceeds at a constant speed. This stepping insures a precise machining along the space curve in accordance with the two readings. The extension of the electronic control system for three-dimensional guiding is shown within the dashed outline of FIG. 9.

USE AND OPERATION

As above described the use of a master print to provide the information for precisely machining a workpiece contemplates that the prescribed path of the cutting means of the machine tool is computed for the prepared master print. When it is required that the cutting means (such as an end-mill) be changed in size, the master print must also be changed. In the case of tape control apparatus this requires a complete reprogramming and a new tape. In the present invention it merely requires a new master print to be made.

The original master print may be used as in the apparatus of FIG. 10 and in a positioner 26 a stylus of a selected diameter is used to provide a new line drawing wherein the edge to be "read" is made to coincide with the newly determined cutting path. The width of line contemplated for an original master print may be ten-thousandths of an inch. This line is made to be used with a cutting tool of determined size and depending on either an inside or outside reading or both the new line on the new master print is drawn by using a stylus of a different diameter. Using either inside or outside "reading" techniques and selected stylus sizes, the determined line contour may be readily and accurately produced. Of course as new drawing may also be produced by using the apparatus of FIGS. 12–15.

It is to be noted that there may be occasions where the line of the print has a spot, scratch and the like which causes the optical head to give a "blind" or "degenerate" reading to the encoder 100. In the design of the encoder this potential condition is recognized and hence the encoder is provided with means to program a few more pulses corresponding to the last acceptable "word" received by the encoder. In a preferred embodiment, three pulses are caused to be continued with a "blind" or "degenerate" "word" is received by the encoder. These continuing pulses are the same as the pulse programmed by the last acceptable "word" received. If the "blind" or "degenerate" signal persists, the encoder, after the third such unacceptable consecutive signal, causes the apparatus to shut-down or to stop. A manual override control means may then be used to move the optical head and the machine tool positioner to a new position to again read the edge of the line of the drawing.

It should be noted that the pulse width of the master clock 80 is only a fraction of the repetition time T. T is then broken into portions wherein certain operations are performed. In a preferred embodiment, the interval T is programmed as follows:

(a) Optical heat at rest; bias voltage to photo-transistors; signals to encoder, time approximately one-tenth of T;

(b) Encoder compares information from memory with truth table; sends proper signal to driver, time a few micro-seconds;

(c) Driver operates proper stepping motor for determined period of time, time about six-tenths of T;

(d) Period of rest to be sure all vibrations have ceased, time about two-tenths of T;

(e) Reset of circuit, and (f) Repeat of steps (a) through (e).

It is also to be noted that although four optical fibers 60 are shown in FIG. 3 it is contemplated that the optical decoding matrix may be constructed of more than four fibers.

It is also contemplated that the optical head may be cycled in a straight line and the data being read be oriented sequentially at difference angles thereto. Such an arrangement would require only plus or minus reading and/or writing steps while the data or drawing sheet is rotated and/or repositioned as desired.

The novel optical reading head of this invention is stationary during each and every reading of a line or edge. The movement of the head is accomplished between readings in small steps such as one-thousandth of an inch thereby the system may be referred to the group known as sampled data control systems. The steps are made at selected intervals of rate of speed which may be varied to suit the conditions of operation, viz. machine meal and the like, drawing a line, etc.

In the use of the above apparatus it is of particular note that in accordance with FIG. 1 the opto-graphical memory may be used to produce a master print or by reading a master print or workpiece a positioner in combination with a machine tool may be controlled. The combinations of use available through the opto-graphical memory are shown in FIG. 1. It should be noted that an optical head is used to read the data stepwise and the secondary apparatus is moved in response to the movement of the head.

It should be noted that disecting the image by means of optical fibers (in the optical decoding matrix) is a necessity dictated by today's availability in miniature fast photosensitors. One must recognize, however, that the intensity of illumination is inversely proportional to the square of magnification, therefore, whether by a lens system or by fiber optics the magnification of the object corresponds to a loss of the intensity of the illumination. Ideally the object should be projected directly onto photosensitive chips having five-thousandths of an inch diameter or the like, said chips being arranged into the geometry displayed in FIG. 4. The use and application of such complex photosensitors is contemplated by this invention upon the availability of such choices.

Terms such as "in," "out," "up," "down," "inner," "outer," "clockwise," "counterclockwise" and the like as applied to the apparatus and circuits of the opto-graphical memory and digitalized control system as shown and described in conjunction with the several drawings and figures are used merely for the purpose of description and do not necessarily apply to a particular position in which the opto-graphical memory and digitalized control system may be constructed or used.

The conception of the above described opto-graphical memory and its application to produce data or precisely machined workpieces is not limited to the embodiments above described but departures therefrom may be made within the scope of the accompanying claims and protection is sought to the broadest extent the prior art allows.

What is claimed is:

1. An opto-graphical memory and digitalized control system for precision machining, producing master prints and the like, in which curves of one, two and three dimensional determination are illuminated to produce a brightness difference between the edge of the curve and the adjacent areas thereof, the system adapted to "read" the curve and convert the curve into linear and rectilinear equivalents, said opto-graphical memory and control system comprising: (a) a source of data to be "read"; (b) an optical sensing means including a grouping of at least four optical fibers arranged in a precision square, a photosensitor attached to one end of each optical fiber, said fiber arranged to receive an image of a portion of the data such as a line, the image receiving ends of the fibers arranged as a matrix and positioned in a focal plane, and with the photosensitors responsive to the reading of the data so as to send a signal in response to said reading; (c) means for displacing in a stepwise manner the optical sensing means relative to the source being "read," the stepwise displacement corresponding in movements to at least one of the one, two and three coordinate directions of the information being "read"; (d) a logic system adapted to receive said signals from the photosensitors and adapted to transcribe said signals into stepping commands for the means for displacing the optical sensing means and the source being "read"; (e) a secondary positioning means adapted to receive a series of signals from the logic system, said signals corresponding in command to the signals fed to the means for stepwise displacement of the optical sensing means and the source being "read"; and (f) means for displacing in a stepwise manner the secondary positioning means in response to the signals received from the logic system, the stepwise displacement of the secondary positioning being in a precise relationship to the displacement of the optical sensing means and source being "read."

2. An opto-graphical memory and digitalized control system as in claim 1 in which the stepwise displacement of the secondary positioning is in the same coordinate direction as the displacement of the optical sensing means.

3. An opto-graphical memory and digitalized control system as in claim 1 in which the optical sensing means is movable in a stepwise manner in a precise plane and in which the optical head includes at least four optical fibers in which the adjacent fibers are positioned to coincide and be moved precisely in alignment with the coordinate directions of movement.

4. An opto-graphical memory and digitalized control system as in claim 1 in which the source of data being "read" is movable in a stepwise manner and in a precise plane, and in which the direction of movements of the source of data coincide with the arrangement of adjacent optical fibers in the optic head.

5. An opto-graphical memory and digitalized control system as in claim 1 in which the optical sensing means is movable in a stepwise manner in a precise plane and in which the optical head includes at least four optical fibers in which the adjacent fibers are positioned to coincide and be moved precisely in alignment with the coordinate directions of movement, and in which the source of data being "read" is also movable in a stepwise manner and in a precise plane with the direction of movements of the source of data coinciding with the arrangement of adjacent optical fibers in the optic head.

6. An opto-graphical memory and digitalized control system as in claim 1 in which the optical sensing means is an optical head which includes therein a plurality of grouped optical fibers with each fiber having a tapered end portion extending from a main body to an image receiving end of greatly reduced diameter, the body end of the optical fiber being optically connected to the photosensitor; and in which an additional photosensitor not a part of the reading matrix is carried by the optical head, said additional photosensitor adapted to "read" the general light level of the source of data and act as a control means for the signals received from the grouped optical fibers; and in which the localized data being read is fed through a lens system so as to determinedly magnify the viewed localized data on the image receiving ends of the fibers.

7. An opto-graphical memory and digitalized control ssytem as in claim 6 in which the lens system is a constant object-to-image distance type of lens and in which an aperture is provided to define the incident light-flux received from the data being read.

8. An opto-graphical memory and digitalized control system as in claim 7 in which the aperture is adjustable in response to an electro-optical signal system.

9. An opto-graphical memory and digitalized control system as in claim 1 in which the image end of the fiber optics and the disposition of the photosensitors may be displaceable in relation to each other.

10. An opto-graphical memory and digitalized control system as in claim 1 in which the logic system is an electronic logic system and in which the means for moving the optical sensing means and for moving the secondary positioning means are stepping motors adapted to provide a precise movement of the operatively engaged means.

11. An opto-graphical memory and digitalized control system as in claim 10 in which the electronic logic system includes basic "solid" state components such as transistors and diodes.

12. An opto-graphical memory and digitalized control system as in claim 10 in which there is provided an additional reading-writing head with positioning means for a system adapted to read-write a line representative of a third dimension corresponding to a coordinate $z$, the additional head adapted to move substantially in synchronism with the stepwise movement of the $x$–$y$ optical sensing means.

13. An opto-graphical memory and digitalized control system as in claim 6 in which the optical fibers are fixedly mounted in a housing which is moved in determined steps, and in which the optical housing and the fibers therein are brought to a stationary condition during the reading of the data.

14. An opto-graphical memory and digitalized control system as in claim 10 in which the electronic logic system includes a master clock and the like adapted to provide a variable clock-rate in which the selection of the rate may be made by the operator, said clock providing pulses of fixed duration at the selected speeds, each pulse providing an actuation of a stepping motor as transcribed by the logic system.

15. An opto-graphical memory and digitalized control system for precision machining, producing master prints and the like, in which one and two dimensional curves to be read are illuminated to induce a brightness difference between edge of the curve and the adjacent areas thereof, the system adapted to "read" the drawn curve and convert the curve into stepwise linear and stepwise rectilinear equivalents, said opto-graphical memory and control system comprises:

(a) a source of data to be "read";

(b) an optical sensing means for reading the source of data, said sensing means including a grouping of at least four fiber optics arranged in a precision square, a photosensitor attached to one end of each fiber optic, said fibers arranged to receive an image of a portion of the data such as a line, with the image receiving ends of the fibers arranged as a matrix and positioned in a focal plane of lens system and with the photosensitors responsive to the reading of the data so as to send a signal in response to said reading;

(c) means for stepwise moving the optical sensing means in a precise plane to correspond to one and two coordinate directions, and when the optical head includes four fiber optics the adjacent fibers are positioned to coincide with and move precisely in alignment with the coordinate directions;

(d) a logic system adapted to receive said signal and adapted to transform said signals into stepping commands for moving the optical system;

(e) a secondary positioning means adapted to receive a series of signals from the logic system, said signals corresponding in command to the signals fed to the means for stepwise moving of the optical sensing means, and (f) means for stepwise moving the secondary positioning means in response to the signals received from the logic system, the stepwise moving of the secondary positioning means being in the same coordinate direction and in a precise relationship to the steps of the optical sensing means.

16. An opto-graphical memory and digitalized control system as in claim 15 in which the optical sensing means includes an optical housing, a pair of arm members disposed at right angles to each other and providing axial alignments corresponding to $x$ and $y$ coordinates, each arm member adapted to engage and support the housing so as to move the housing as the arm is moved, a stepping motor cooperatively connected to each arm to move the connected arm and the housing engaged therewith to-and-fro a determined distance in response to a pulse signal from the logic system, and in which there is provided an illuminated table disposed a determined distance below the head and in a plane parallel to both arms, and in which the data is a means providing an edge to be read, said edge being the line of a drawing, the edge of a template, the edge of a workpiece and the like.

17. An opto-graphical memory and digitalized control system as in claim 15 in which there is provided a housing for enclosing the memory, a drawing transporting roller carried by the housing and rotatable therein, a stepping motor operatively connected to and adapted to rotate the roller forwardly and backwardly in a steplike manner, sprocket teeth provided at selected positions on the roller, said sprocket teeth adapted to engage precisely formed and positioned apertures in the edge of a master print drawing, an optical head carried by the housing and reciprocably movable in a precisely guided path therein, said path in alignment with the axis of the drawing transporting roller, means for moving the optical head in its guided path, and a stepping motor cooperatively engaged with the means for moving the optical head, the stepping motors being activated for determined pulse durations in response to the signals provided by the digitalized control.

18. An opto-graphical memory and digitalized control system as in claim 15 in which there is also provided a positioning means adapted for reading and writing in a third $z$ dimension which means includes a slave positioner similar to the secondary positioning means, the slave positioner having an illuminated drawing transporting means adapted to move a master print stepwise forwardly and rearwardly, and an optical head reciprocably movable in a plane at precisely a right angle to the movement of the master print, the movement of the master print representing the sum of $x$ and $y$ coordinate steps of a space curve and the reciprocable movement of the head representing the $z$ steps of the space curve.

19. An opto-graphical memory and digitalized control system as in claim 18 in which the optical head of the slave positioner includes an optical fiber and a photosensitor optically connected thereto, the optical fiber adapted to read the data of the master print; and in which optical head includes an additional photosensitor not a part of the optical fiber system, the additional photosensitor adapted to "read" the general light level of the source of data and act as a control means for the signals received from the optical fiber.

20. An opto-graphical memory and digitalized control system as in claim 15 in which the secondary positioner is provided with a line producing means which includes means for receiving one of a plurality of styluses each capable of printing a line of a precisely desired width, said positioner adapted to move the selected mounted stylus stepwise in a precise plane, and in which there is provided a support surface for retaining a data storage medium, the support surface defining a plane which is a precise distance from the discharge end of the stylus.

21. An opto-graphical memory and digitalized control system in claim 20 in which the support surface is adapted to removably retain a mechanically stable medium such as a metal plate, Mylar film and the like, and in which the data stored thereon has a line of determined width is produced with an accuracy of at least one-thousandth of an inch, said stored data representing the geometry of the design to be memorized graphically.

22. An opto-graphical memory and digitalized control system as in claim 18 in which a first master print is a source of data for reading by an optical head containing a plurality of optical fibers and in which the movement of said head is stepwise in determined increments and in prescribed paths corresponding to the $x$ and $y$ coordinates of a space curve, and in which an additional master print is the source of data for reading by a second optical head having a single optical fiber, the movement of said second head being in stepwise reciprocating increments corresponding to the $z$ coordinates of a space curve, and in which there is provided means for controlling the reading of the first and second optical heads so that simultaneously controlling signals are fed so as to control the movement of a tertiary positioner mounted on a machine tool whereby to form a workpiece carried by the tool to correspond to the geometry described by lines of the master prints.

23. An opto-graphical memeory and digitalized control system as in claim 15 in which a function generator is disposed below the optical sensing means said function generator including an illuminated table defining a plane parallel to the movement of the optical head; and in which there is a straight-edge movable in the plane of the table and pivotally mounted at one end, said pivot defining an origin of axes representing $x$ and $y$ coordinates, and in which there is means for moving the straight-edge to any determined angle within at least forty-five degrees of a coordinate axis which may be the $x$ coordinate.

24. An opto-graphical memory and digitalized control system as in claim 23 in which the means for moving the straight-edge includes a straight-edge guiding pin, means for rectilinearly moving the guiding pin to move the straight-edge to a determined angle, and there is provided means for measuring the precise movement of the pin in both the $x$ and $y$ directions.

25. An opto-graphical memory and digitalized control system as in claim 24 in which the secondary positioner is provided with a writing system.

26. An opto-graphical memory and digitalized control system as in claim 24 in which the illuminated table additionally includes a series of accurately formed arcs of determined spacing thereby providing edges for reading by the optical head, the center of the radius of the formed arcs coinciding with the pivot axis of the straight-edge, the arcs having an extent of at least forty-five degrees with the ends of the arcs terminating at lines which intersect the pivot axis, and with the terminating lines defined so that the optical head as it reads the line causes a signal to be sent to logic system for determination of further actuations.

27. An opto-graphical memory and digitalized control system as in claim 24 in which the logic system is provided with switching means adapted to limit the cycling automatic travel of the optical head to movement within an octant of a circle.

28. An opto-graphical memory and digitalized control system as in claim 23 in which the illuminated table additionally may include geometric shapes such as arcs, curves, ellipses, and the like.

29. An opto-graphical memory and digitalized control system for precision machining, producing master prints and the like, in which curves of one, two and three dimensional determination are illuminated to produce a brightness difference between the edge of the curve and the adjacent areas thereof, the system adapted to "read" the curve and convert the curve into linear and rectlinear equivalents, said opto-graphical memory and control system comprising: (a) a source of data to be "read"; (b) an optical sensing means including a grouping of at least four photosensitive chips arranged equidistantly from adjacent chips, said chips adapted to receive an image of a portion of the data such as a line, the image receiving chips arranged as a matrix and positioned in a determined plane, the photosensitive chips being responsive to the reading of the data so as to send a signal in response to said reading; (c) means for displacing in a stepwise manner the optical sensing means relative to the source being "read", the stepwise displacement corresponding in movements to at least one of the one, two and three coordinate directions of the information being "read"; (d) a logic system adapted to receive said signals from the photosensitors and adapted to transcribe said signals into stepping commands for the means of displacing the optical sensing means and the source being "read"; (e) a secondary positioning means adapted to receive a series of signals from the logic system, said signals corresponding in command to the signals fed to the means for stepwise displacement of the optical sensing means and the source being "read," and (f) means for displacing in a stepwise manner the secondary positioning means in response to the signals received from the logic system, the stepwise displacement of the secondary positioning being in precise relationship to the displacement of the optical sensing means and source being "read."

References Cited

UNITED STATES PATENTS

| | | | |
|---|---|---|---|
| 2,420,716 | 5/1947 | Morton et al. | 250—227 |
| 3,260,848 | 7/1966 | Gordon | 250—202 |
| 3,311,749 | 3/1967 | Briggs | 250—227 X |
| 3,301,543 | 1/1967 | Semper | 250—202 X |
| 3,335,287 | 8/1967 | Hargens | 250—202 X |
| 3,429,989 | 2/1969 | Stockdale | 250—202 X |

ROBERT SEGAL, Primary Examiner

C. R. CAMPBELL, Assistant Examiner

U.S. Cl. X.R.

219—125; 250—209

PO-1050
(5/69)

UNITED STATES PATENT OFFICE
CERTIFICATE OF CORRECTION

Patent No. 3,502,882 Dated March 24th, 1970

Inventor(s) Geza von Voros

It is certified that error appears in the above-identified patent and that said Letters Patent are hereby corrected as shown below:

Col. 1, line 40, "Invention" should be capatilized.
Col. 5, line 2, the period should be a semi-colon.
Col. 7, line 26, "dimeter" should read -- diameter --.
Col. 7, line 74, "is" should read -- as --.
Col. 8, line 22, there should be a period after "4".
Col. 8, line 65, "assuming" should read -- assume --.
Col. 10, line 57, "photosensittors" should read --photosensitors --.
Col. 13, line 46, "transcribed" should read -- transcribe --.
Col. 15, line 3, "connected to a 'reset' switch and/or" should read -- returned to their zero (center) position --.
Col. 17, line 17, "accurracy" should read -- accuracy --.
Col. 20, line 37, "as" should read -- a --.
Col. 20, line 46, "with" should read -- when --.

Col. 22, line 64, "ssytem" should read -- system --.
Col. 23, line 36, after "between" should be inserted -- the --.
Col. 23, line 49, before "lens" should be inserted -- a --.
Col. 24, line 48, after "which" should be inserted -- the --.
Col. 24, line 65, after "system" should be inserted -- as --.

Col. 26, line 9, "rectlinear" should read -- rectilinear --.

SIGNED AND SEALED
AUG 11 1970

(SEAL)
Attest:

Edward M. Fletcher, Jr.
Attesting Officer

WILLIAM E. SCHUYLER, JR.
Commissioner of Patents